US008225203B2

(12) United States Patent
Unruh

(10) Patent No.: US 8,225,203 B2
(45) Date of Patent: Jul. 17, 2012

(54) SPELL-CHECK FOR A KEYBOARD SYSTEM WITH AUTOMATIC CORRECTION

(75) Inventor: Erland Unruh, Seattle, WA (US)

(73) Assignee: Nuance Communications, Inc., Burlington, MA (US)

( * ) Notice: Subject to any disclaimer, the term of this patent is extended or adjusted under 35 U.S.C. 154(b) by 33 days.

(21) Appl. No.: 12/939,918

(22) Filed: Nov. 4, 2010

(65) Prior Publication Data

US 2011/0193797 A1 Aug. 11, 2011

Related U.S. Application Data

(63) Continuation-in-part of application No. 12/023,903, filed on Jan. 31, 2008.

(60) Provisional application No. 60/887,748, filed on Feb. 1, 2007.

(51) Int. Cl.
*G06F 17/00* (2006.01)
*G06F 17/21* (2006.01)
*G09G 5/00* (2006.01)

(52) U.S. Cl. ........ 715/255; 715/257; 715/259; 715/773; 704/10; 704/240; 345/172; 345/173

(58) Field of Classification Search .................. 715/200, 715/205, 209, 227, 229, 231, 253, 254, 255, 715/256, 259, 260, 261, 273, 700, 762, 771, 715/773, 831; 704/1, 9, 10, 239, 240, 257; 345/170, 171, 172, 173
See application file for complete search history.

(56) References Cited

U.S. PATENT DOCUMENTS

| | | | |
|---|---|---|---|
| 3,980,869 | A | 9/1976 | Lombardino et al. |
| 4,286,329 | A | 8/1981 | Goertzel et al. |
| 4,365,235 | A | 12/1982 | Greanias et al. |
| 4,439,649 | A | 3/1984 | Cecchi |
| 4,454,592 | A | 6/1984 | Cason et al. |
| 4,559,598 | A | 12/1985 | Goldwasser et al. |
| 4,561,105 | A | 12/1985 | Crane et al. |
| 4,573,196 | A | 2/1986 | Crane et al. |
| 4,689,768 | A | 8/1987 | Heard et al. |
| 4,710,758 | A | 12/1987 | Mussler et al. |

(Continued)

FOREIGN PATENT DOCUMENTS

CN 1116335 A 2/1996

(Continued)

OTHER PUBLICATIONS

"Handbook for the Palm V™ Organizer", Palm Computing, Inc., Santa Clara, CA, 1998-1999, Total of 244 pages.

(Continued)

*Primary Examiner* — Maikhanh Nguyen
(74) *Attorney, Agent, or Firm* — Michael A. Glenn; Glenn Patent Group

(57) ABSTRACT

User input is received, specifying a continuous traced path across a keyboard presented on a touch sensitive display. An input sequence is resolved, including traced keys and auxiliary keys proximate to the traced keys by prescribed criteria. For each of one or more candidate entries of a prescribed vocabulary, a set-edit-distance metric is computed between said input sequence and the candidate entry. Various rules specify when penalties are imposed, or not, in computing the set-edit-distance metric. Candidate entries are ranked and displayed according to the computed metric.

19 Claims, 17 Drawing Sheets

U.S. PATENT DOCUMENTS

| | | | |
|---|---|---|---|
| 4,725,694 A | 2/1988 | Auer et al. | |
| 4,782,464 A | 11/1988 | Gray et al. | |
| 4,783,758 A | 11/1988 | Kucera | |
| 4,783,761 A | 11/1988 | Gray et al. | |
| 4,891,777 A | 1/1990 | Lapeyre | |
| 4,891,786 A | 1/1990 | Goldwasser | |
| 5,109,352 A | 4/1992 | O'Dell | |
| 5,127,055 A | 6/1992 | Larkey | |
| 5,187,480 A | 2/1993 | Thomas et al. | |
| 5,224,179 A | 6/1993 | Denker et al. | |
| 5,261,112 A | 11/1993 | Futatsugi et al. | |
| 5,305,205 A | 4/1994 | Weber et al. | |
| 5,317,507 A | 5/1994 | Gallant | |
| 5,347,295 A | 9/1994 | Agulnick et al. | |
| 5,457,454 A | 10/1995 | Sugano | |
| 5,462,711 A | 10/1995 | Ricottone | |
| 5,533,147 A | 7/1996 | Arai et al. | |
| 5,561,446 A | 10/1996 | Montlick | |
| 5,572,423 A | 11/1996 | Church | |
| 5,574,482 A | 11/1996 | Niemeier | |
| 5,577,170 A | 11/1996 | Karow | |
| 5,583,946 A | 12/1996 | Gourdol | |
| 5,586,198 A | 12/1996 | Lakritz | |
| 5,612,690 A | 3/1997 | Levy | |
| 5,616,031 A | 4/1997 | Logg | |
| 5,649,223 A | 7/1997 | Freeman | |
| 5,664,896 A | 9/1997 | Blumberg | |
| 5,675,361 A | 10/1997 | Santilli | |
| 5,734,749 A | 3/1998 | Yamada et al. | |
| 5,734,750 A | 3/1998 | Arai et al. | |
| 5,745,719 A | 4/1998 | Falcon | |
| 5,748,512 A | 5/1998 | Vargas | |
| 5,754,686 A | 5/1998 | Harada et al. | |
| 5,784,008 A | 7/1998 | Raguseo | |
| 5,796,867 A | 8/1998 | Chen et al. | |
| 5,798,760 A | 8/1998 | Vayda et al. | |
| 5,799,269 A * | 8/1998 | Schabes et al. | 704/9 |
| 5,805,911 A | 9/1998 | Miller | |
| 5,812,696 A | 9/1998 | Arai et al. | |
| 5,812,697 A | 9/1998 | Sakai et al. | |
| 5,818,437 A | 10/1998 | Grover et al. | |
| 5,828,999 A | 10/1998 | Bellegarda et al. | |
| 5,870,492 A | 2/1999 | Shimizu et al. | |
| 5,896,321 A | 4/1999 | Miller et al. | |
| 5,917,476 A | 6/1999 | Czerniecki | |
| 5,917,889 A | 6/1999 | Brotman et al. | |
| 5,920,303 A | 7/1999 | Baker et al. | |
| 5,923,793 A | 7/1999 | Ikebata | |
| 5,926,566 A | 7/1999 | Wang et al. | |
| 5,928,588 A | 7/1999 | Chen et al. | |
| 5,933,526 A | 8/1999 | Sklarew | |
| 5,937,420 A | 8/1999 | Karow et al. | |
| 5,952,942 A | 9/1999 | Balakrishnan et al. | |
| 5,953,541 A | 9/1999 | King et al. | |
| 5,956,021 A | 9/1999 | Kubota et al. | |
| 5,963,671 A | 10/1999 | Comerford et al. | |
| 5,973,676 A | 10/1999 | Kawakura | |
| 6,002,390 A | 12/1999 | Masui | |
| 6,002,799 A | 12/1999 | Sklarew | |
| 6,005,495 A | 12/1999 | Connolly et al. | |
| 6,008,799 A | 12/1999 | Van Kleeck | |
| 6,009,444 A | 12/1999 | Chen | |
| 6,011,554 A | 1/2000 | King et al. | |
| 6,018,708 A * | 1/2000 | Dahan et al. | 704/244 |
| 6,028,959 A | 2/2000 | Wang et al. | |
| 6,037,942 A | 3/2000 | Millington | |
| 6,041,137 A | 3/2000 | Van Kleeck | |
| 6,044,165 A | 3/2000 | Perona et al. | |
| 6,052,130 A | 4/2000 | Bardon et al. | |
| 6,054,941 A | 4/2000 | Chen | |
| 6,075,469 A | 6/2000 | Pong | |
| 6,088,649 A | 7/2000 | Kadaba et al. | |
| 6,094,197 A | 7/2000 | Buxton et al. | |
| 6,098,034 A * | 8/2000 | Razin et al. | 704/9 |
| 6,104,317 A | 8/2000 | Panagrossi | |
| 6,104,384 A | 8/2000 | Moon et al. | |
| 6,111,573 A | 8/2000 | Mccomb et al. | |
| 6,130,962 A | 10/2000 | Sakurai | |
| 6,144,764 A | 11/2000 | Yamakawa et al. | |
| 6,148,104 A | 11/2000 | Wang et al. | |
| 6,157,379 A | 12/2000 | Singh | |
| 6,169,538 B1 | 1/2001 | Nowlan et al. | |
| 6,172,625 B1 | 1/2001 | Jin et al. | |
| 6,204,848 B1 | 3/2001 | Nowlan et al. | |
| 6,212,297 B1 | 4/2001 | Sklarew | |
| 6,215,485 B1 | 4/2001 | Phillips | |
| 6,223,059 B1 | 4/2001 | Haestrup | |
| 6,275,611 B1 | 8/2001 | Parthasarathy | |
| 6,278,445 B1 | 8/2001 | Tanaka et al. | |
| 6,285,768 B1 | 9/2001 | Ikeda | |
| 6,286,064 B1 | 9/2001 | King et al. | |
| 6,307,548 B1 * | 10/2001 | Flinchem et al. | 715/811 |
| 6,307,549 B1 | 10/2001 | King et al. | |
| 6,314,418 B1 | 11/2001 | Namba | |
| 6,320,943 B1 | 11/2001 | Borland | |
| 6,346,894 B1 | 2/2002 | Connolly et al. | |
| 6,362,752 B1 | 3/2002 | Guo et al. | |
| 6,392,640 B1 | 5/2002 | Will | |
| 6,424,743 B1 | 7/2002 | Ebrahimi | |
| 6,437,709 B1 | 8/2002 | Hao | |
| 6,448,987 B1 | 9/2002 | Easty et al. | |
| 6,453,079 B1 | 9/2002 | Mcinerny | |
| 6,489,951 B1 | 12/2002 | Wong et al. | |
| 6,493,464 B1 | 12/2002 | Hawkins et al. | |
| 6,502,118 B1 | 12/2002 | Chatterjee | |
| 6,542,170 B1 | 4/2003 | Williams et al. | |
| 6,549,219 B2 | 4/2003 | Selker | |
| 6,567,072 B2 | 5/2003 | Watanabe | |
| 6,585,162 B2 | 7/2003 | Sandbach et al. | |
| 6,611,252 B1 | 8/2003 | Defaux | |
| 6,616,703 B1 | 9/2003 | Nakagawa | |
| 6,643,647 B2 | 11/2003 | Natori | |
| 6,654,733 B1 | 11/2003 | Goodman et al. | |
| 6,686,852 B1 | 2/2004 | Guo | |
| 6,686,907 B2 | 2/2004 | Su et al. | |
| 6,711,290 B2 | 3/2004 | Sparr et al. | |
| 6,757,544 B2 | 6/2004 | Rangarjan et al. | |
| 6,765,554 B2 | 7/2004 | Millington | |
| 6,765,567 B1 | 7/2004 | Roberson et al. | |
| 6,801,190 B1 | 10/2004 | Robinson et al. | |
| 6,801,659 B1 | 10/2004 | O'Dell | |
| 6,807,529 B2 | 10/2004 | Johnson et al. | |
| 6,819,315 B2 | 11/2004 | Toepke et al. | |
| 6,820,075 B2 | 11/2004 | Shanahan et al. | |
| 6,829,607 B1 | 12/2004 | Tafoya et al. | |
| 6,864,809 B2 | 3/2005 | O'Dell et al. | |
| 6,904,402 B1 | 6/2005 | Wang et al. | |
| 6,912,581 B2 | 6/2005 | Johnson et al. | |
| 6,947,771 B2 | 9/2005 | Guo et al. | |
| 6,955,602 B2 | 10/2005 | Williams | |
| 6,956,968 B1 | 10/2005 | O'Dell et al. | |
| 6,970,599 B2 | 11/2005 | Longe et al. | |
| 6,973,332 B2 | 12/2005 | Mirkin et al. | |
| 6,982,658 B2 | 1/2006 | Guo | |
| 6,990,534 B2 | 1/2006 | Mikhailov et al. | |
| 7,020,270 B1 | 3/2006 | Ghassabian | |
| 7,020,849 B1 | 3/2006 | Chen | |
| 7,030,863 B2 | 4/2006 | Longe et al. | |
| 7,057,607 B2 | 6/2006 | Mayoraz et al. | |
| 7,075,520 B2 | 7/2006 | Williams | |
| 7,088,345 B2 | 8/2006 | Robinson et al. | |
| 7,088,861 B2 | 8/2006 | Van Meurs | |
| 7,095,403 B2 | 8/2006 | Lyustin et al. | |
| 7,107,204 B1 | 9/2006 | Liu et al. | |
| 7,117,144 B2 * | 10/2006 | Goodman et al. | 704/9 |
| 7,139,430 B2 | 11/2006 | Sparr et al. | |
| 7,149,550 B2 | 12/2006 | Kraft et al. | |
| 7,151,533 B2 | 12/2006 | Van Ieperen | |
| 7,155,683 B1 | 12/2006 | Williams | |
| 7,162,305 B2 | 1/2007 | Tong et al. | |
| 7,177,797 B1 | 2/2007 | Micher et al. | |
| 7,224,989 B2 | 5/2007 | Kraft | |
| 7,256,769 B2 | 8/2007 | Pun et al. | |
| 7,257,528 B1 | 8/2007 | Ritchie et al. | |
| 7,272,564 B2 | 9/2007 | Phillips et al. | |
| 7,275,029 B1 | 9/2007 | Gao et al. | |
| 7,277,088 B2 | 10/2007 | Robinson et al. | |

| | | | |
|---|---|---|---|
| 7,283,999 B1 | 10/2007 | Ramesh et al. | |
| 7,286,115 B2 | 10/2007 | Longe | |
| 7,293,231 B1 | 11/2007 | Gunn et al. | |
| 7,313,277 B2 | 12/2007 | Morwing et al. | |
| 7,349,576 B2 | 3/2008 | Holtsberg | |
| 7,385,531 B2 | 6/2008 | Zhang | |
| 7,389,235 B2 | 6/2008 | Dvorak | |
| 7,437,001 B2 | 10/2008 | Morwing et al. | |
| 7,453,439 B1 | 11/2008 | Kushler et al. | |
| 7,466,859 B2 | 12/2008 | Chang et al. | |
| 7,584,173 B2 * | 9/2009 | Bax et al. | 1/1 |
| 7,720,682 B2 | 5/2010 | Stephanick et al. | |
| 7,750,891 B2 | 7/2010 | Stephanick et al. | |
| 7,778,818 B2 | 8/2010 | Longe et al. | |
| 7,821,503 B2 | 10/2010 | Stephanick et al. | |
| 7,920,132 B2 | 4/2011 | Longe et al. | |
| 2001/0033295 A1 | 10/2001 | Phillips | |
| 2001/0048425 A1 | 12/2001 | Partridge | |
| 2002/0093491 A1 | 7/2002 | Allen et al. | |
| 2002/0122072 A1 | 9/2002 | Selker | |
| 2002/0135499 A1 | 9/2002 | Guo | |
| 2002/0135561 A1 | 9/2002 | Rojewski | |
| 2002/0145587 A1 | 10/2002 | Watanabe | |
| 2002/0163544 A1 | 11/2002 | Baker et al. | |
| 2002/0168107 A1 | 11/2002 | Tang et al. | |
| 2002/0188448 A1 * | 12/2002 | Goodman et al. | 704/254 |
| 2003/0006956 A1 | 1/2003 | Wu et al. | |
| 2003/0011574 A1 | 1/2003 | Goodman | |
| 2003/0023426 A1 | 1/2003 | Pun et al. | |
| 2003/0033288 A1 | 2/2003 | Shanahan | |
| 2003/0048257 A1 | 3/2003 | Mattila | |
| 2003/0054830 A1 | 3/2003 | Williams et al. | |
| 2003/0144830 A1 | 7/2003 | Williams | |
| 2003/0179930 A1 | 9/2003 | O'Dell et al. | |
| 2003/0184451 A1 | 10/2003 | Li | |
| 2003/0234766 A1 | 12/2003 | Hildebrand | |
| 2004/0153963 A1 | 8/2004 | Simpson et al. | |
| 2004/0153975 A1 | 8/2004 | Williams et al. | |
| 2004/0163032 A1 | 8/2004 | Guo et al. | |
| 2004/0243389 A1 | 12/2004 | Thomas et al. | |
| 2004/0260694 A1 | 12/2004 | Chaudhuri et al. | |
| 2005/0060138 A1 | 3/2005 | Wang et al. | |
| 2005/0114770 A1 | 5/2005 | Sacher et al. | |
| 2005/0135678 A1 | 6/2005 | Wecker et al. | |
| 2005/0169527 A1 | 8/2005 | Longe et al. | |
| 2005/0174333 A1 | 8/2005 | Robinson et al. | |
| 2005/0190970 A1 | 9/2005 | Griffin | |
| 2005/0210383 A1 | 9/2005 | Cucerzan et al. | |
| 2005/0223308 A1 | 10/2005 | Gunn et al. | |
| 2006/0062461 A1 | 3/2006 | Longe et al. | |
| 2006/0129928 A1 | 6/2006 | Qiu | |
| 2006/0136408 A1 | 6/2006 | Weir et al. | |
| 2006/0155536 A1 | 7/2006 | Williams et al. | |
| 2006/0158436 A1 | 7/2006 | LaPointe et al. | |
| 2006/0173807 A1 | 8/2006 | Weir et al. | |
| 2006/0176283 A1 | 8/2006 | Suraqui | |
| 2006/0190819 A1 | 8/2006 | Ostergaard et al. | |
| 2006/0193519 A1 | 8/2006 | Sternby | |
| 2006/0236239 A1 | 10/2006 | Simpson et al. | |
| 2006/0239560 A1 | 10/2006 | Sternby | |
| 2006/0247915 A1 | 11/2006 | Bradford et al. | |
| 2006/0274051 A1 * | 12/2006 | Longe et al. | 345/173 |
| 2007/0016616 A1 | 1/2007 | Brill et al. | |
| 2007/0040813 A1 | 2/2007 | Kushler | |
| 2007/0050360 A1 | 3/2007 | Hull et al. | |
| 2007/0094718 A1 | 4/2007 | Simpson | |
| 2007/0203879 A1 | 8/2007 | Templeton-Steadman et al. | |
| 2007/0203894 A1 | 8/2007 | Jones et al. | |
| 2007/0276653 A1 | 11/2007 | Greenwald et al. | |
| 2007/0276814 A1 | 11/2007 | Williams | |
| 2007/0285397 A1 | 12/2007 | LaPointe et al. | |
| 2008/0100579 A1 | 5/2008 | Robinson et al. | |
| 2008/0130996 A1 | 6/2008 | Sternby | |
| 2008/0133222 A1 | 6/2008 | Kogan et al. | |
| 2008/0291059 A1 | 11/2008 | Longe | |
| 2009/0007001 A1 | 1/2009 | Morin et al. | |
| 2009/0037399 A1 | 2/2009 | Bartz et al. | |
| 2009/0089665 A1 | 4/2009 | White et al. | |
| 2009/0105959 A1 | 4/2009 | Braverman et al. | |
| 2009/0226098 A1 | 9/2009 | Takahashi et al. | |
| 2009/0234826 A1 | 9/2009 | Bidlack | |
| 2009/0284471 A1 | 11/2009 | Longe et al. | |
| 2010/0082343 A1 * | 4/2010 | Levit et al. | 704/257 |
| 2010/0257478 A1 | 10/2010 | Longe et al. | |
| 2010/0325136 A1 | 12/2010 | Chaudhuri et al. | |
| 2011/0193797 A1 | 8/2011 | Unruh | |
| 2011/0234524 A1 | 9/2011 | Longe | |

FOREIGN PATENT DOCUMENTS

| | | |
|---|---|---|
| CN | 1190205 A | 8/1998 |
| CN | 1232204 A | 10/1999 |
| CN | 1358299 A | 7/2002 |
| CN | 1606753 | 4/2005 |
| DE | 3401942 | 11/1984 |
| EP | 0114250 A2 | 8/1984 |
| EP | 0739521 | 10/1996 |
| EP | 0762265 A2 | 3/1997 |
| EP | 0858023 A2 | 8/1998 |
| EP | 0961208 A1 | 12/1999 |
| EP | 1018679 A2 | 7/2000 |
| EP | 1085401 A1 | 3/2001 |
| EP | 1168780 A2 | 1/2002 |
| EP | 1355225 A1 | 10/2003 |
| FR | 2824979 A1 | 11/2002 |
| JP | 05-7010832 | 1/1982 |
| JP | 60-204065 | 10/1985 |
| JP | 60204065 | 10/1985 |
| JP | 62065136 | 3/1987 |
| JP | 1023021 | 1/1989 |
| JP | 1047565 | 2/1989 |
| JP | 05-027896 | 2/1993 |
| JP | 1993081482 | 4/1993 |
| JP | 05-233600 | 9/1993 |
| JP | 6083512 | 3/1994 |
| JP | 1994083512 | 3/1994 |
| JP | 1994083816 | 3/1994 |
| JP | 7094376 | 4/1995 |
| JP | 1995146918 | 6/1995 |
| JP | 1996305701 | 11/1996 |
| JP | 8319721 | 12/1996 |
| JP | 09-185612 | 7/1997 |
| JP | 9185612 | 7/1997 |
| JP | 10-143309 | 5/1998 |
| JP | 10135399 | 5/1998 |
| JP | 10143309 | 5/1998 |
| JP | 10-154144 | 6/1998 |
| JP | 10154144 | 6/1998 |
| JP | 10-275046 | 10/1998 |
| JP | 10275046 | 10/1998 |
| JP | 11021274 | 1/1999 |
| JP | 11028406 | 2/1999 |
| JP | 1999338858 | 12/1999 |
| JP | 2001043205 | 2/2001 |
| JP | 2001282778 | 10/2001 |
| JP | 2002244803 | 8/2002 |
| JP | 2003005888 | 1/2003 |
| JP | 2003500771 | 1/2003 |
| JP | 2003533816 | 11/2003 |
| KR | 20010107388 | 12/2001 |
| KR | 20020004419 | 1/2002 |
| TW | 498264 B | 8/2002 |
| WO | 97/05541 A1 | 2/1997 |
| WO | 98/16889 | 4/1998 |
| WO | 99/15952 A2 | 4/1999 |
| WO | 00/72300 A1 | 11/2000 |
| WO | 00/74240 A1 | 12/2000 |
| WO | 0188680 | 11/2001 |
| WO | 0188680 A1 | 11/2001 |
| WO | 03/21788 | 3/2003 |
| WO | 2004/111812 A2 | 12/2004 |
| WO | 2004/111871 A1 | 12/2004 |
| WO | 2006/026908 A1 | 3/2006 |

OTHER PUBLICATIONS

"Pilot POBox (Jul. 1997)", http://www.csl.sony.co.jp/person/maui/POBox/ilot.html, Printout form dated 1/03/20, no translation provided, Total of 7 pages.

"POBox Example 2", http://www.csl.sony..co.jp/person/masui/POBox/example2.html, Printout form dated 1/03/20, no translation provided, Total of 2 pages.

"Quick Stroke Information", Synaptics, retrieved on Nov. 18, 2006 from website: www.synaptics.com/products/quickstroke_faq.cfm and www.synaptics.com/products/quickstroke.cfm, Total of 4 pages.

"Softava Q12 Mobile's Keypad", http://www.softava.com/q12, Printout dated Oct. 24, 2006, Total of 3 pages.

"What is Fastap; What Fastap Does; How it Works", retrieved online on Oct. 24, 2006 from url: www.digitwireless.com, 3 pages.

Amin, A. et al., "Recognition of Hand-printed Chinese Characters Using Decision Trees/Machine Learning of C4.5 System", Pattern Analysis and Applications, vol. 1, Issue 2, 1998, 130-141.

Arnott, John , "Probabilistic Character Disambiguation for Reduced Keyboards Using Small Text Samples", AAC Augmentative and Alternative Communication, vol. 8, No. 3, Dept. Math & comp. Sci.; Univ of Dundee, Dundee, Tayside, Scotland, Sep. 1992, 215-223.

Chen, Ju-Wei et al., "A Hierarchical Representation for the Reference Database of On-Line Chinese Character Recognition", Advances in Structural and Syntactical Pattern Recognition. 6th International Workshop INSPEC Abstract No. C9702-1250B-021, 6th International Workshop, SSPR '96, Aug. 20-23, 1996, Total of 1 page.

Cheng, R et al., "Recognition of Radicals in Handwritten Chinese Characters by Means of Problem Reduction and Knowledge Guidance", International Journal of Pattern Recognition and Artificial Intelligence, INSPEC Abstract No. C9706-5260B-280, Sep. 1996, Total of 1 page.

Chou, Kuo-Sen et al., "Radical-Based Neighboring Segment Matching for On-Line Chinese Character Recognition", Computer Processing of Oriental Languages, INSPEC Abstract No. B9701-6140C-682, C9701-1250B-019, Apr. 1997, Total of 1 page.

Chou, Kuo-Sen et al., "Radical-Based Neighboring Segment Matching for On-Line Chinese Character Recognition", Proceedings of the 13th International Conference on Pattern Recognition, INSPEC Abstract No. B9701-6140C-682, C9701-1250B-019, Aug. 25-26, 1996, Total of 1 page.

Connell, S. et al., "Template-based Online Character Recognition", Department of Computer Science and Engineering, Michigan State University, East Lansing, Michigan, Aug. 10, 1999, 1-30.

Fan, Fang et al., "An On-Line Handwritten Chinese Character Recognition System", Proceedings of the SPIE—The International Society for Optical Engineering, INSPEC Abstract No. C2000-12-5260B-085, Jan. 26-27 2000, Total of 1 page.

Garrett, M. et al., "Implementation of Dasher, an Information Efficient Input Mechanism", Presented at LINUX 2003 Conference, D. Ward, I. Murray, P. Cowans, and D. Mackay (Additional Authors), Edinburgh, Scotland, 07/11/20203, Total of 6 pages.

Hung, Kwok-Wah et al., "Boxing Code for Stroke-Order Free Handprinted Chinese Characters Recognition", Proceedings of IEEE International Conference on Systems, Man, Cybernetics, INSPEC Abstract No. C2001-01-5260B-087, Oct. 8-11, 2000, Oct. 8, 2000, Total of 1 page.

Isokoski, P. et al., "Architecture for Personal Text Entry Methods", In Closing the Gap: Software Engineering and Human-Computer Interaction, IFIP, 2003, 1-8.

Isokoski, P. et al., "Combined Model for Text Entry Rate Development", CHI2003 Extended Abstracts, Apr. 5-10, 2003, 752-753.

Isokoski, P. et al., "Comparison of Two Touchpad-Based Methods for Numeric Entry", CHI Letters: Human Factors in Computing Systems, CHI 2002, vol. 4 No. 1, Apr. 20-25, 2002, 25-32.

Isokoski, P. et al., "Device Independent Text Input: A Rationale and an Example", Proceedings of the Working Conference on Advanced Visual Interfaces AVI2000, May 23-26, 2000, Palermo, Italy, 2000, 76-83.

Isokoski, P. , "Model for Unistroke Writing Time", CHI Letters: Human Factors in Computing Systems, SIGCHI 2001, vol. 3, No. 1, Mar. 31-Apr. 5, 2001, 357-364.

Isokoski, P. et al., "Report on the CHI2001 Workshop on Text Entry on Mobile Systems", SIGCHI Bulletin, MacKenzie, S. I. (Additional Author), Sep./Oct. 2001, 14.

Isokoski, P. et al., "Text Entry on Mobile Systems: Directions for the Future", CHI 2001 Extended Abstracts, Mar. 31-Apr. 5, 2001, 2495.

Isokoski, P. , "Text Input Methods for Eye Trackers Using Off-Screen Targets", in Proceedings of Eye Tracking Research & Applications Symposium 2000, ACM, Nov. 6-8, 2000, 15-21.

Kim, Ki-Cheol et al., "On-Line Recognition of Stroke-Order Free Cursive Chinese Characters with Relaxation Matching", Journal of the Korea Information Science Society, NSPEC Abstract No. C9507-1250B-022, Mar. 1995, Total of 1 page.

Kristensson, et al., "Relaxing Stylus Typing Precision by Geometric Pattern Matching", ACM Proc. of the 10th Int'l Conf. on Intelligent User Interfaces, Jan. 9, 2005, pp. 151-158.

Kukich, Karen , "Techniques for Automatically Correcting Words in Text", ACM Computing Surveys, vol. 24, Dec. 1992, 377-439.

Li, Xiaolin et al., "On-Line Handwritten Alphanumeric Character Recognition Using Feature Sequences", Department of Computer Science, Hong Kong University of Science and Technology, Clear Water Bay, Kowloon, Hong Kong, 1995, Total of 8 pages.

Lin, Chang-Keng et al., "Stroke-Order Independent On-Line of Handwritten Chinese Characters", Proceedings of the SPIE—The International Society for Optical Engineering, INSPEC Abstract No. C90031813, Nov. 8-10, 1989, Total of 1 page.

Liu, J.Z. et al., "Two-layer Assignment Method for Online Chinese Character Recognition", EEE Proceedings—Vision, Image and Signal Processing, INSPEC Abstract No. C2000-06-1250B-004, Feb. 2000, Total of 1 page.

Liu, Jianzhuang et al., "Stroke Order and Stroke Number Free On-Line Chinese Character Recognition Using Attributed Relational Graph Matching", Proceedings of the 13th International Conference on Pattern Recognition, INSPEC Abstract No. C9701-1250B-035, Aug. 25-29, 1996, Total of 1 page.

Mankoff, Jennifer , "Cirrin: A Word-Level Unistroke Keyboard for Pen Input", Proceedings of UIST 1998, Abowd, Gregory D.(Additional Author), Technical note, Nov. 1-4, 1998, 213-214.

Mankoff, Jennifer , "Error Correction Techniques for Handwriting, Speech and other Ambiguous or Error Prone Systems", GVU TechReport, Abowd, Gregory D. (Additional Author), GIT-GVU-99-18, Jun. 1999, Total of 9 pages.

Masui, T. , "An Efficient Text Input method for Pen-based Computers", Proceedings of the ACM Conf. on Human Factors in Computing Systems, ACM Press, Apr. 1998, 238-335.

Masui, T. , "POBox: An Efficient Text Input Method for Handheld and Ubiquitous Computers", Sony Computer Science Laboratories, Apr. 1998, Total of 12 pages.

Min, Kyongho , "Syntactic Recovery and Spelling Correction of Ill-formed Sentences", School of Computer Science and Engineering, Wilson, William H. (Additional Author), The University of New South Wales, Feb. 1998, 1-10.

Mollineda, et al., "A Windowed Weighted Approach for Approximate Cyclic String Matching", Google, Presented at the 16th Int'l Conference on Pattern Recognition, Aug. 11, 2002, pp. 188-191.

Naito, S. et al., "Rough Classification for Handprinted Chinese Characters by Stroke Density", Transactions of the Institute of Electronics and Communication Engineers of Japan, INSPEC Abstract No. C82009693, Aug. 1981, Total of 1 page.

Nambu, H. et al., "On-Line Chinese Handwriting Character Recognition: Comparison with Japanese Kanji Recognition and Improvement of Input Efficiency", Transactions of the Information Processing Society of Japan, NSPEC Abstract No. B2000-01-6135E-035, C2000-01-5260B-099, Aug. 1999, Total of 1 page.

Odaka, K. et al., "Stroke Order Free On-Line Handwritten Character Recognition of Algorithm", Transactions of the Institute of Electronics and Communication Engineers of Japan, Section E, INSPEC Abstract No. C82041007, Jun. 1982, Total of 1 page.

Pan, Bao-Chang et al., "Recognition of Handprinted Chinese Characters by Stroke Order Codes", International Conference on Computer Processing of Chinese and Oriental Languages, INSPEC Abstract No. C89024386, Aug. 29-Sep 1, 1988, Total of 1 page.

Park, Hee-Seon et al., "An On-line Recognition System for Cursive Chinese Characters with Effective Coarse Classification and Elastic Matching", Journal of the Korea Information Science Society, INSPEC Abstract No. C9404-1250B-001, Sep. 1993.

Perlin, K., "Quikwriting: Continuous Stylus-Based Text Entry", Presented at ACM UIST'98 Conference, Nov. 1-4, 1998, 215-216.

Romero, R. et al., "Optical Chinese Character Recognition using Probabilistic Neural Networks", Imaging Systems Lab, Robotics Institute, Carnegie Mellon University, Pittsburgh, PA, Jul. 1996, 1-18.

Sarr, , "Improving Precision and Recall using a Spellchecker in a Search Engine", Master's Thesis, Google 2003, 2003, pp. 1-39.

Seni, G. et al., "Large Vocabulary Recognition of On-Line Handwritten Cursive Words", Presented at IEEE Transactions on Pattern Analysis and Machine Intelligence, Jun. 1996, 1-6.

Shin, J., "Online Handwriting Character Analysis Using Stroke Correspondence Search", Journal of Shanghai University, Aizu University, Fukushima, Japan, INSPEC Abstract No. C2001-11-1250B-012, Sep. 2001, Total of 1 page.

Srihari, S. et al., "Cherry Blossom: A System for Japanese Character Recognition", Center for Excellence for Document Analysis and Recognition, State University of New York at Buffalo, Buffalo, NY, 1997, Total of 15 pages.

Stockton, R. et al., "JKanji: Wavelet-based Interactive Kanji Competition", Proceedings of the 15th International Conference on Pattern Recognition, Sep. 3-7 2000, Total of 1 page.

Vuurpijl, L. et al., "Coarse Writing-Style Clustering Based on Simple Stroke-Related Features", Institute for Cognition and Information, University of Nijmegen, Nijmegen, The Netherlands, 1997, Total of 6 pages.

Zhai, Shumin , "Shorthand Writing on Stylus Keyboard", CHI 2003, Kristensson, Per-Ola (Additional Author), vol. 5 No. (1), 2003, 97-104.

Zheng, Jing et al., "Recognizing On-Line Handwritten Chinese Character Via FARG Matching", Proceedings of the Fourth International Conference on Document Analysis and Recognition, Aug. 18-20, 1997, INSPEC Abstract No. B9711-6140C-162, C971-5260B-123, 1997, Total of 1 page.

Quixal, et al., "Strategies for the generation of individualized feedback in distance language learning", Google 2007, pp. 1-8.

* cited by examiner

240

|  | Target | r | e | s | u | l | t |
|---|---|---|---|---|---|---|---|
| Input (characters) | 0 | 1 | 2 | 3 | 4 | 5 | 6 |
| r | 1 | 0 | 1 | 2 | 3 | 4 | 5 |
| e | 2 | 1 | 0 | 1 | 2 | 3 | 4 |
| s | 3 | 2 | 1 | 0 | 1 | 2 | 3 |
| s | 4 | 3 | 2 | 1 | 1 | 2 | 3 |
| u | 5 | 4 | 3 | 2 | 1 | 2 | 3 |
| m | 6 | 5 | 4 | 3 | 2 | 2 | 3 |
| t | 7 | 6 | 5 | 4 | 3 | 3 | 2 |

FIG. 3
*(Prior Art)*

|  | Target | r | e | s | u | l | t |
|---|---|---|---|---|---|---|---|
| Input (keys) | 0 | 1 | 2 | 3 | 4 | 5 | 6 |
| {7,p,q,r,s} | 1 | 0 | 1 | 2 | 3 | 4 | 5 |
| {3,d,e,f} | 2 | 1 | 0 | 1 | 2 | 3 | 4 |
| {7,p,q,r,s} | 3 | 2 | 1 | 0 | 1 | 2 | 3 |
| {7,p,q,r,s} | 4 | 3 | 2 | 1 | 1 | 2 | 3 |
| {8,t,u,v} | 5 | 4 | 3 | 2 | 1 | 2 | 3 |
| {6,m,n,o} | 6 | 5 | 4 | 3 | 2 | 2 | 3 |
| {8,t,u,v} | 7 | 6 | 5 | 4 | 3 | 3 | 2 |

FIG. 4

| Target Word | m | a | s | s | a | c | h | u | s | e | t | t | s |
|---|---|---|---|---|---|---|---|---|---|---|---|---|---|
| Exact-Tap Input | m | a | a | s |  |  |  |  |  |  |  |  |  |
| Nearby Alternative Letters | j | s | s | w |  |  |  |  |  |  |  |  |  |
|  | n | z | z | e |  |  |  |  |  |  |  |  |  |

FIG. 5A

| Target Word | m | a | s | s | a | c | h | u | s | e | t | t | s |
|---|---|---|---|---|---|---|---|---|---|---|---|---|---|
| Exact-Tap Input | m | a | g | s | | | | | | | | | |
| Nearby Alternative Letters | j | s | h | w | | | | | | | | | |
| | n | z | b | e | | | | | | | | | |

FIG. 5B

| Target Word | r | é | s | u | m | é |
|---|---|---|---|---|---|---|
| Key Input | r | e | s | | | |
| Additional Letter Variations | | é | | | | |
| | | è | | | | |
| | | ê | | | | |

FIG. 5C

|   |   | m | i | s | s | p | e | l | l |
|---|---|---|---|---|---|---|---|---|---|
|   | 0 | 1 | 2 | 3 | 4 | 5 | 6 | 7 | 8 |
| m | 1 | 0 | 1 | 2 | 3 | 4 | 5 | 6 | 7 |
| i | 2 | 1 | 0 | 1 | 2 | 3 | 4 | 5 | 6 |
| s | 3 | 2 | 1 | 0 | 1 | 2 | 3 | 4 | 5 |
| p | 4 | 3 | 2 | 1 | 1 | 1 | 2 | 3 | 4 |
| e | 5 | 4 | 3 | 2 | 2 | 2 | 1 | 2 | 3 |
| l | 6 | 5 | 4 | 3 | 3 | 3 | 2 | 1 | 2 |

FIG. 7

| T |   |   |
|---|---|---|
|   | S | D |
|   | I | X |

FIG. 8

|   |   | x | x | x | x | x | x | x | x | x |
|---|---|---|---|---|---|---|---|---|---|---|
|   | 0 | 1 | 2 | 3 | 4 | 5 | 6 | 7 | 8 | 9 |
| x | 1 | 0 | 1 | 2 | 3 | 4 | 5 | 6 | 7 | 8 |
| x | 2 | 1 | 0 | 1 | 2 | 3 | 4 | 5 | 6 | 7 |
| x | 3 | 2 | 1 | 0 | 1 | 2 | 3 | 4 | 5 | 6 |
| x | 4 | 3 | 2 | 1 | 0 | 1 | 2 | 3 | 4 | 5 |
| x | 5 | 4 | 3 | 2 | 1 | 0 | 1 | 2 | 3 | 4 |
| x | 6 | 5 | 4 | 3 | 2 | 1 | 0 | 1 | 2 | 3 |

FIG. 9

|   |   | x | x | x | x | x | x | x | x | x |
|---|---|---|---|---|---|---|---|---|---|---|
|   |   | 0 | 1 | 2 | 3 | 4 | 5 | 6 | 7 | 8 | 9 |
| y | 1 | 0 | 1 | 2 | 3 | 4 | 5 | 6 | 7 | 8 |
| x | 2 | 1 | 0 | 1 | 2 | 3 | 4 | 5 | 6 | 7 |
| x | 3 | 2 | 1 | 0 | 1 | 2 | 3 | 4 | 5 | 6 |
| x | 4 | 3 | 2 | 1 | 0 | 1 | 2 | 3 | 4 | 5 |
| x | 5 | 4 | 3 | 2 | 1 | 0 | 1 | 2 | 3 | 4 |
| x | 6 | 5 | 4 | 3 | 2 | 1 | 0 | 1 | 2 | 3 |

FIG. 10A

|   |   | x | x | x | x | x | x | x | x | x |
|---|---|---|---|---|---|---|---|---|---|---|
|   |   | 0 | 1 | 2 | 3 | 4 | 5 | 6 | 7 | 8 | 9 |
| y | 1 | 1 | 1 | 2 | 3 | 4 | 5 | 6 | 7 | 8 |
| x | 2 | 1 | 1 | 1 | 2 | 3 | 4 | 5 | 6 | 7 |
| x | 3 | 2 | 1 | 1 | 1 | 2 | 3 | 4 | 5 | 6 |
| x | 4 | 3 | 2 | 1 | 1 | 1 | 2 | 3 | 4 | 5 |
| x | 5 | 4 | 3 | 2 | 1 | 1 | 1 | 2 | 3 | 4 |
| x | 6 | 5 | 4 | 3 | 2 | 1 | 1 | 1 | 2 | 3 |

|   |   | x | x | x | x | x | x | x | x | x |
|---|---|---|---|---|---|---|---|---|---|---|
|   |   | 0 | 1 | 2 | 3 | 4 | 5 | 6 | 7 | 8 | 9 |
| y | 1 | 1 | 2 | 2 | 3 | 4 | 5 | 6 | 7 | 8 |
| x | 2 | 1 | 1 | 2 | 2 | 3 | 4 | 5 | 6 | 7 |
| x | 3 | 2 | 1 | 1 | 2 | 2 | 3 | 4 | 5 | 6 |
| x | 4 | 3 | 2 | 1 | 1 | 2 | 2 | 3 | 4 | 5 |
| x | 5 | 4 | 3 | 2 | 1 | 1 | 2 | 2 | 3 | 4 |
| x | 6 | 5 | 4 | 3 | 2 | 1 | 1 | 2 | 2 | 3 |

|   |   | x | x | x | x | x | x | x | x | x |
|---|---|---|---|---|---|---|---|---|---|---|
|   |   | 0 | 1 | 2 | 3 | 4 | 5 | 6 | 7 | 8 | 9 |
| y | 1 | 1 | 2 | 3 | 3 | 4 | 5 | 6 | 7 | 8 |
| x | 2 | 1 | 1 | 2 | 3 | 3 | 4 | 5 | 6 | 7 |
| x | 3 | 2 | 1 | 1 | 2 | 3 | 3 | 4 | 5 | 6 |
| x | 4 | 3 | 2 | 1 | 1 | 2 | 3 | 3 | 4 | 5 |
| x | 5 | 4 | 3 | 2 | 1 | 1 | 2 | 3 | 3 | 4 |
| x | 6 | 5 | 4 | 3 | 2 | 1 | 1 | 2 | 3 | 3 |

|   |   | x | x | x | x | x | x | x | x | x |
|---|---|---|---|---|---|---|---|---|---|---|
|   |   | 0 | 1 | 2 | 3 | 4 | 5 | 6 | 7 | 8 | 9 |
| y | 1 | 1 | 2 | 3 | 4 | 4 | 5 | 6 | 7 | 8 |
| x | 2 | 1 | 1 | 2 | 3 | 4 | 4 | 5 | 6 | 7 |
| x | 3 | 2 | 1 | 1 | 2 | 3 | 4 | 4 | 5 | 6 |
| x | 4 | 3 | 2 | 1 | 1 | 2 | 3 | 4 | 4 | 5 |
| x | 5 | 4 | 3 | 2 | 1 | 1 | 2 | 3 | 4 | 4 |
| x | 6 | 5 | 4 | 3 | 2 | 1 | 1 | 2 | 3 | 4 |

FIG. 10B

|   | x | x | x | x | x | x | x | x | x |   |   |   |   |   | 9 | 9 | 9 | 9 | 9 | 9 | 9 |
|---|---|---|---|---|---|---|---|---|---|---|---|---|---|---|---|---|---|---|---|---|---|
|   | 0 | 1 | 2 | 3 | 4 | 5 | 6 | 7 | 8 | 9 |   |   |   |   | 9 | 3 | 3 | 3 | 3 | 3 | 3 |
| x | 1 | 0 | 1 | 2 | 3 | 4 | 5 | 6 | 7 | 8 |   |   |   | 9 | 2 | 2 | 2 | 2 | 2 | 2 |   |
| x | 2 | 1 | 0 | 1 | 2 | 3 | 4 | 5 | 6 | 7 |   |   | 9 | 1 | 1 | 1 | 1 | 1 | 1 | 1 |   |
| x | 3 | 2 | 1 | 0 | 1 | 2 | 3 | 4 | 5 | 6 |   | 9 | 0 | 0 | 0 | 0 | 0 | 0 | 0 |   |   |
| x | 4 | 3 | 2 | 1 | 0 | 1 | 2 | 3 | 4 | 5 |   | 9 | 1 | 1 | 1 | 1 | 1 | 1 |   |   |   |
| x | 5 | 4 | 3 | 2 | 1 | 0 | 1 | 2 | 3 | 4 |   | 9 | 2 | 2 | 2 | 2 | 2 |   |   |   |   |
| x | 6 | 5 | 4 | 3 | 2 | 1 | 0 | 1 | 2 | 3 |   | 9 | 3 | 3 | 3 | 3 |   |   |   |   |   |

FIG. 11

|   | D |   |
|---|---|---|
| T | S | X |
|   | I |   |

FIG. 12

| Input Sequence | 2ABC | 3DEF | 4GHI |
|---|---|---|---|
| Set-based comparison | 2a*bc* | 3d*ef* | 4*ghi* |
| With Set-E.D. spell correction | 2a*bc*<br>3def | 3d*ef*<br>2abc<br>4ghi | 4*ghi*<br>3d*ef* |
| Letters of target word | *b* | *e* | *d* |

FIG. 13

| | | | | | | | | | | | | |
|---|---|---|---|---|---|---|---|---|---|---|---|---|
| I00: | 0 | 0 | 0 | 0 | - | - | - | - | - | - | - | - |
| I01: | 1 | 1 | 1 | 1 | 1 | - | - | - | - | - | - | - |
| I02: | 2 | 2 | 2 | 2 | 2 | 2 | - | - | - | - | - | - |
| I03: | 3 | 3 | 3 | 3 | 3 | 3 | 3 | - | - | - | - | - |
| I04: | - | 4 | 4 | 4 | 4 | 4 | 4 | 4 | - | - | - | - |
| I05: | - | - | 5 | 5 | 5 | 5 | 5 | 5 | 5 | - | - | - |
| I06: | - | - | - | 6 | 6 | 6 | 6 | 6 | 6 | 6 | - | - |
| I07: | - | - | - | - | 7 | 7 | 7 | 7 | 7 | 7 | 7 | - |
| I08: | - | - | - | - | - | 8 | 8 | 8 | 8 | 8 | 8 | 8 |
| Word: | 0 | 1 | 2 | 3 | 4 | 5 | 6 | 7 | 8 | 9 | 10 | 11 |

FIG. 14

| | | | | | | |
|---|---|---|---|---|---|---|
| I00: | 0 | - | - | - | - | - |
| I01: | 1 | 1 | - | - | - | - |
| I02: | 2 | 2 | 2 | - | - | - |
| I03: | 3 | 3 | 3 | 3 | - | - |
| I04: | - | 4 | 4 | 4 | 4 | - |
| I05: | - | - | 5 | 5 | 5 | 5 |
| I06: | - | - | - | 6 | 6 | 6 |
| I07: | - | - | - | - | 7 | 7 |
| I08: | - | - | - | - | - | 8 |
| Word: | 0 | 1 | 2 | 3 | 4 | 5 |

```
Pos 0 ET9REGIONALKEY    ET9AMBIG  ET9KTLETTER SHIFT [186,28]  (ext 255 1)
 SymbsInfo 0   (251)     p P
 SymbsInfo 1   (   4)    o<f2><f3><f4><f5><f6><f8><14d><14f><151><153><1a1>
                         O<d2><d3><d4><d5><d6><d8><14c><14e><150><152><1a0>
Pos 1 ET9DISCRETEKEY     ET9AMBIG  ET9KTLETTER [166,28]  (ext 0 1)
 SymbsInfo 0   (254)     o<f2><f3><f4><f5><f6><f8><14d><14f><151><153><1a1>
                         O<d2><d3><d4><d5><d6><d8><14c><14e><150><152><1a0>
 SymbsInfo 1   (254)     l<ec><ed><ee><ef><129><12b><12d><12f><131><133>
                         I<cc><cd><ce><cf><128><12a><12c><12e>I<132>
 SymbsInfo 2   (254)     u<f9><fa><fb><fc><169><16b><16d><16f><171><173><1b0>
                         U<d9><da><db><dc><168><16a><16c><16e><170><172><1af>
 SymbsInfo 3   (254)     y<fd><ff><177> Y<dd><178><176>
 SymbsInfo 4   (254)     t<fe><163><165><167> T<de><162><164><166>
 SymbsInfo 5   (254)     r<155><157><159> R<154><156><158>
Pos 2 ET9REGIONALKEY     ET9AMBIG  ET9KTLETTER [75,27]  (ext 255 1)
 SymbsInfo 0   (219)     e<e8><e9><ea><eb><113><115><117><119><11b>
                         E<c8><c9><ca><cb><112><114><116><118><11a>
 SymbsInfo 1   ( 35)     r<155><157><159> R<154><156><158>
 SymbsInfo 2   (  1)     w<175> W<174>
Pos 3 ET9DISCRETEKEY     ET9AMBIG  ET9KTLETTER [87,28]  (ext 0 1)
 SymbsInfo 0   (254)     r<155><157><159> R<154><156><158>
 SymbsInfo 1   (254)     t<fe><163><165><167> T<de><162><164><166>
Pos 4 ET9REGIONALKEY     ET9AMBIG  ET9KTLETTER [120,28]  (ext 255 1)
 SymbsInfo 0   (230)     y<fd><ff><177> Y<dd><178><176>
 SymbsInfo 1   ( 16)     t<fe><163><165><167> T<de><162><164><166>
 SymbsInfo 2   (  9)     u<f9><fa><fb><fc><169><16b><16d><16f><171><173><1b0>
                         U<d9><da><db><dc><168><16a><16c><16e><170><172><1af>
```

SPELL-CHECK FOR A KEYBOARD SYSTEM WITH AUTOMATIC CORRECTION

CROSS REFERENCE TO RELATED APPLICATIONS

This application is a continuation-in-part of U.S. patent application Ser. No. 12/023,903 entitled SPELL-CHECK FOR A KEYBOARD SYSTEM WITH AUTOMATIC CORRECTION, filed Jan. 31, 2008 in the names of Kay, Unruh, and Tandon. The '903 application claims priority to U.S. Provisional Patent Application Ser. No. 60/887,748, filed Feb. 1, 2007. The entirety of the foregoing documents is hereby, incorporated herein by reference.

BACKGROUND OF THE INVENTION

1. Technical Field

The invention relates to data input devices. More particularly, the invention relates to a spell-check mechanism for a keyboard system having automatic correction capability.

2. Description of the Prior Art

Classic spell-check ("Edit Distance") techniques for transposed/added/dropped characters have a relatively long history. See, for example, Kukich, K., *Techniques for Automatically Correcting Words*, ACM Computing Surveys, Vol. 24, No. 4 (December 1992); Peterson, J. L., *Computer Programs for Detecting and Correcting Spelling Errors*, The Communications of the ACM, Volume 23, No. 12 (December 1980); and Daciuk, J., *Spelling Correction in the paper Incremental Construction of Finite-State Automata and Transducers, and their Use in the Natural Language Processing* (1998).

But classic spell-check techniques can only handle a certain number of differences between the typed word and the intended correct word. Because the best correction candidate is presumed to be the one with the fewest changes, spell-check algorithms are confounded by, for example, unknowing shifting of fingers by a typist on the keyboard, or tapping on a touch screen keyboard hurriedly and inaccurately, and thus typing almost every letter wrong.

To limit the amount of computational processing, particularly on lower-performance mobile devices, implementations of the classic algorithms make assumptions or impose constraints to reduce the ambiguity and thus the number of candidate words being considered. For example, they may rely on the initial letters of the word being correct or severely limit the size of the vocabulary.

Another form of automatic error correction, useful both for keyboards on touch-sensitive surfaces and for standard phone keypads, calculates the distances between each input location and nearby letters and compares the entire input sequence against possible words. The word whose letters are the closest to the input locations, combined with the highest frequency and/or recency of use of the word, is the best correction candidate. This technique easily corrects both shifted fingers and hurried tapping. It can also offer reasonable word completions even if the initial letters are not all entered accurately.

The following patent publications describe the use of a "SloppyType" engine for disambiguating and auto-correcting ambiguous keys, soft keyboards, and handwriting recognition systems: Robinson; B. Alex, Longe; Michael R., Keyboard System With Automatic Correction, U.S. Pat. No. 6,801,190 (Oct. 5, 2004), U.S. Pat. No. 7,088,345 (Aug. 8, 2006), and U.S. Pat. No. 7,277,088 (Oct. 2, 2007); Robinson et al, Handwriting And Voice Input With Automatic Correction, U.S. Pat. No. 7,319,957 (Jan. 15, 2008), and U.S. patent application Ser. No. 11/043,525 (filed Jan. 25, 2005). See also, Vargas; Garrett R., Adjusting keyboard, U.S. Pat. No. 5,748,512 (May 5, 1998).

In addition, the following publications cover combinations of manual and vocal input for text disambiguation: Longe, et al., Multimodal Disambiguation of Speech Recognition, U.S. patent application Ser. No. 11/143,409 (filed Jun. 1, 2005); and Stephanick, et al, Method and Apparatus Utilizing Voice Input to Resolve Ambiguous Manually Entered Text Input, U.S. patent application Ser. No. 11/350,234 (filed Feb. 7, 2006).

The "Sloppy Type" technology referenced above uses distance-based error correction on full words. Assuming that the length of the input sequence equals the length of the intended word and that each input location is in the proper order helps compensate for the increased ambiguity introduced by considering multiple nearby letters for each input. But in addition to minor targeting errors, people also transpose keys, double-tap keys, miss a key completely, or misspell a word when typing.

It would be advantageous to provide a mechanism for addressing all forms of typing errors in a way that offers both accurate corrections and acceptable performance.

SUMMARY OF THE INVENTION

User input is received, specifying a continuous traced path across a keyboard presented on a touch sensitive display. An input sequence is resolved, including traced keys and auxiliary keys proximate to the traced keys by prescribed criteria. For one or more candidate entries of a prescribed vocabulary, a set-edit-distance metric is computed between said input sequence and each of the candidate entries. Various rules specify when penalties are imposed, or not, in computing the set-edit-distance metric. Candidate entries are ranked and displayed according to the computed metric. The features described herein may be implemented as an apparatus, programmed product, method, circuit, or a combination of the foregoing.

BRIEF DESCRIPTION OF THE DRAWINGS

FIG. 3 is a table showing standard edit-distance calculation between an input word and a target word using a matrix as a tool, according to one embodiment of the invention.

FIG. 4 is a table illustrating set-edit-distance calculation for input on a 12-key mobile phone according to one embodiment of the invention.

FIGS. 5A-5C are illustrations for explaining the concepts of stem edit-distance and stem set-edit-distance according to one embodiment of the invention.

FIG. 7 is a matrix showing an example for the word "misspell" using standard edit-distance according to one embodiment of the invention.

FIG. 8 is a matrix showing how to find standard edit-distance values based on the cell that is being calculated according to one embodiment of the invention.

FIG. 9 is a matrix showing when the compared words whose stems fully match according to one embodiment of the invention.

FIGS. 10A-10B are a series of matrices showing incremental calculation when there is a mismatch between the words being compared according to one embodiment of the invention.

FIG. 11 shows a rotated/transformed matrix space according to one embodiment of the invention.

FIG. 12 shows how to find standard edit-distance values for the rotated matrix of FIG. 11 according to the invention.

FIG. 13 is a table showing the union of adjacent input sets for an LDB retrieval screening function according to one embodiment of the invention.

FIG. 14 is a length independent screening map for input length 9 according to one embodiment of the invention.

FIG. 15 is a length dependent screening map for target word of length 6 and input length 9 according to one embodiment of the invention.

FIGS. 19-23 show a set edit distance matrix and various shadow matrices according to one embodiment of the invention.

FIGS. 27-30 show a set-edit-distance matrix and various shadow matrices according to one embodiment of the invention.

DETAILED DESCRIPTION OF THE INVENTION

Glossary

For purposes of the discussion herein, the following terms have the meaning associated therewith:

Edit Distance (also "standard" E.D.)—the well-documented algorithm to compare two strings and determine the minimum number of changes necessary to make one the same as the other.

The following abbreviations may be used herein and in the Figures:

T—Transposed (two sequential letters swapped);
I—Inserted (add a letter that wasn't in the other string);
D—Deleted (drop an extra letter from one string);
S—Substituted (replace a letter with another at the same position);
X—the target cell being calculated.

Enhanced Edit Distance, or Set-Edit-Distance (or "fuzzy compare")—the subject of this patent; improved E.D. using a set of letters (with optional probabilities for each) to represent each input rather than a single letter as in standard E.D., plus other optimizations.

Mode—an operational state; for this example, 1 of 2 states, "exact" (only using the exact-tap letter/value from each input event to match each candidate word, as with standard E.D.) or "regional" "set-based" (using multiple letters/values per input); the mode may be either user- or system-specified.

Regional input—a method (or event) including nearby/surrounding letters (with optional probabilities) in addition to the letter/key actually tapped/pressed.

Set-based—the use of multiple character values, rather than just one, to represent each input; each set member may have a different relative probability; a set may also include, e.g. the accented variations of the base letter shown on a key.

"Classic compare", "classic match," Sloppy Type, or "regional correction"—full-word matching using auto-correction considering nearby letters, supra; generally, the number of inputs equals the number of letters in each candidate word (or word stem of a completed word).

Filter or Screen—a rule for short-circuiting the full comparison or retrieval process by identifying and eliminating words that ultimately, will not be added to the selection list anyway.

KDB—Keyboard Database; the information about the keyboard layout, level of ambiguity surrounding each letter, and nearby letters for each letter.

LDB—Linguistic Database, i.e. main vocabulary for a language.

"word tap frequency"—the contribution of physical distance from pressed keys to the likelihood the word is the target word.

DISCUSSION

An embodiment of the invention provides an adaptation of standard edit distance spell-check algorithms that works with probability-based auto-correction algorithms and data structures for ambiguous keypads and other predictive text input systems. Embodiments of the invention also provide strategies for optimization and for ordering results of different types.

Figure 1:
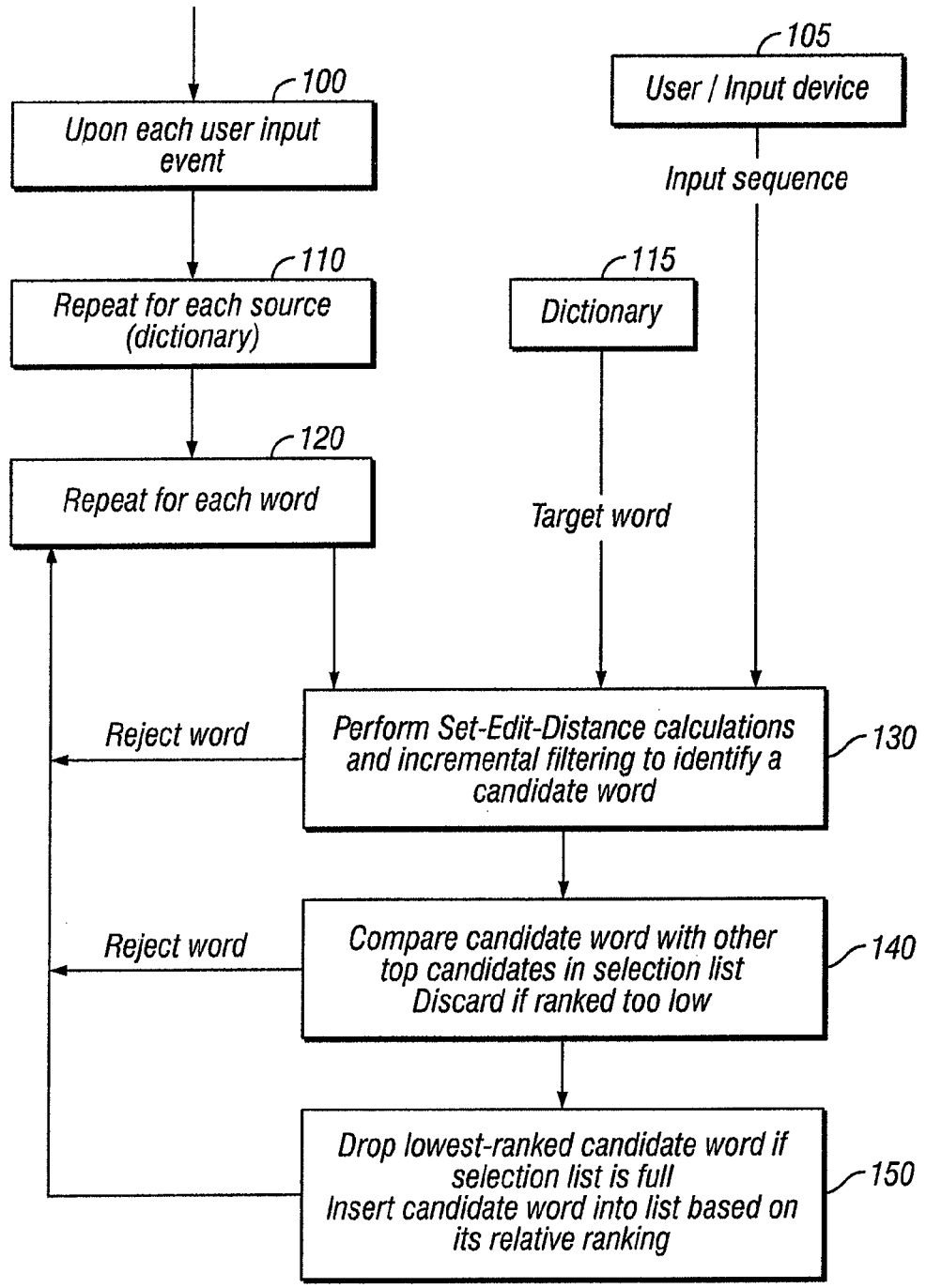
FIG. 1 is a flow diagram of a spell-check method for a keyboard having automatic correction according to one embodiment of the invention.

FIG. 1 is a flow diagram of a spell-check method for a keyboard having automatic correction. FIG. 1 shows a user/input comprising an input sequence that is entered by the user via a data entry device (105), in which the user's input may be ambiguous. At least one dictionary (115) is also provided as a source of target meanings for the user's entry. Upon each user input event (100) the user input sequence is provided to the inventive system. Each source (110), such as the dictionary (115) discussed above, is queried. Potentially every word (120) in each dictionary is supplied, in turn, as input to the inventive system upon each user input event.

Upon receiving these inputs, the system performs incremental filtering and edit distance and regional/probability calculations (130), discarding any word that does not meet minimum thresholds for similarity with the inputs. Then the system compares the results for the input sequence and dictionary inputs with other top matches in a word choice list and discards the word if it is ranked too low on the list (140). The lowest-ranked word in the list is dropped if the list is full, and the word is inserted into the list based on ranking (150). The list is then presented to the user.

Figure 2:
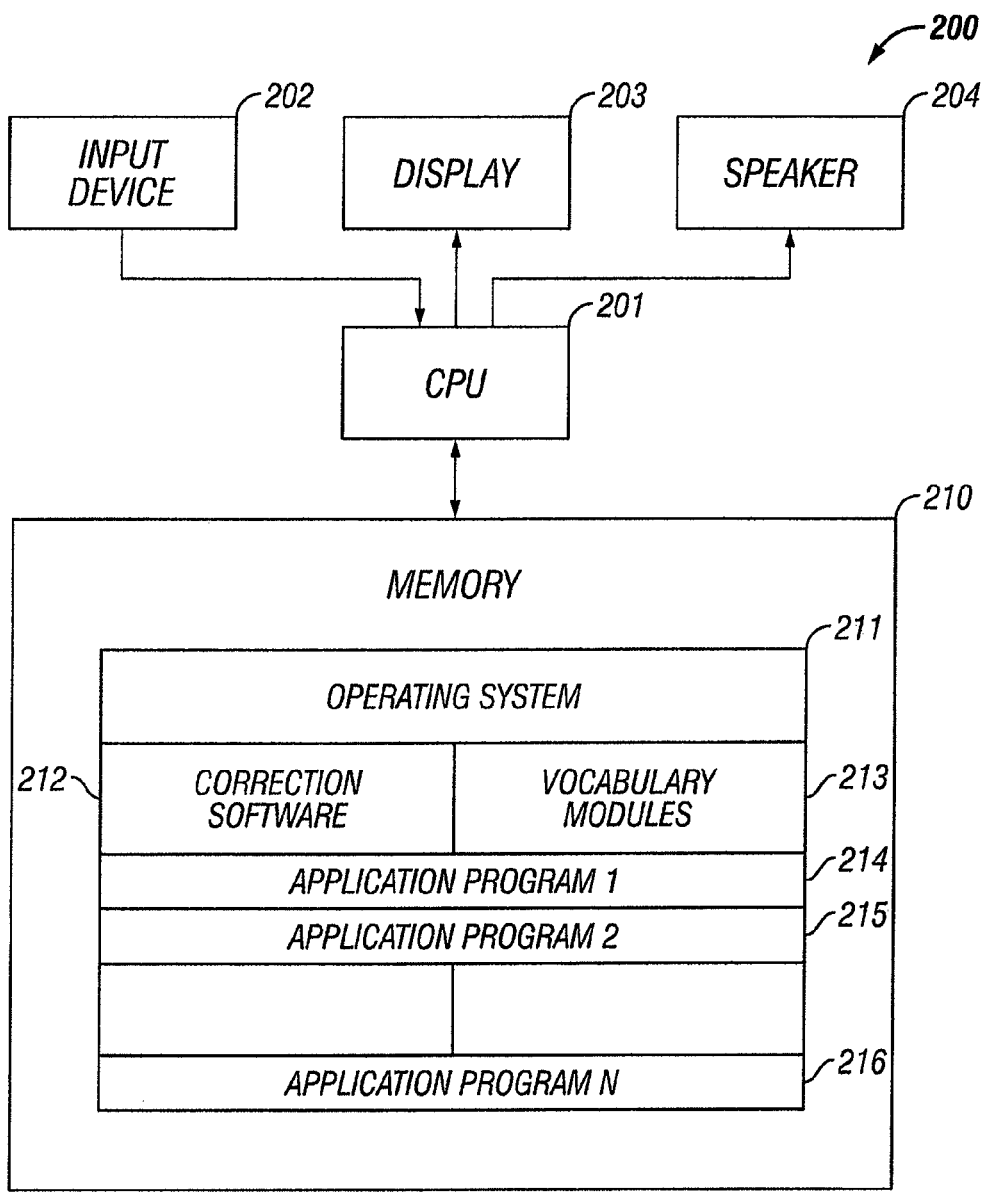
FIG. 2 is a hardware block diagram of an input system input system having spell-check and automatic correction according to one embodiment of the invention.

FIG. 2 is a hardware block diagram of an input system having spell-check and automatic correction 200. The input device 202 and the display 203 are coupled to a processor 201 through appropriate interfacing circuitry. Optionally, a speaker 204 is also coupled to the processor. The processor 201 receives input from the input device, and manages all output to the display and speaker. Processor 201 is coupled to a memory 210. The memory includes a combination of temporary storage media, such as random access memory (RAM), and permanent storage media, such as read-only memory (ROM), floppy disks, hard disks, or CD-ROMs. Memory 210 contains all software routines to govern system operation. Preferably, the memory contains an operating system 211, correction software 212, including software for calculating edit distance and performing spell checking, inter alia, and associated vocabulary modules 213 that are discussed in additional detail herein. Optionally, the memory may contain one or more application programs 214, 215, 216. Examples of application programs include word processors, software dictionaries, and foreign language translators. Speech synthesis software may also be provided as an application program, allowing the input system having full correction capabilities to function as a communication aid.

Exemplary Digital Data Processing Apparatus

Data processing entities such as the CPU 201 may be implemented in various forms. Some examples include a general purpose processor, digital signal processor (DSP), application specific integrated circuit (ASIC), field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Figure 2A:
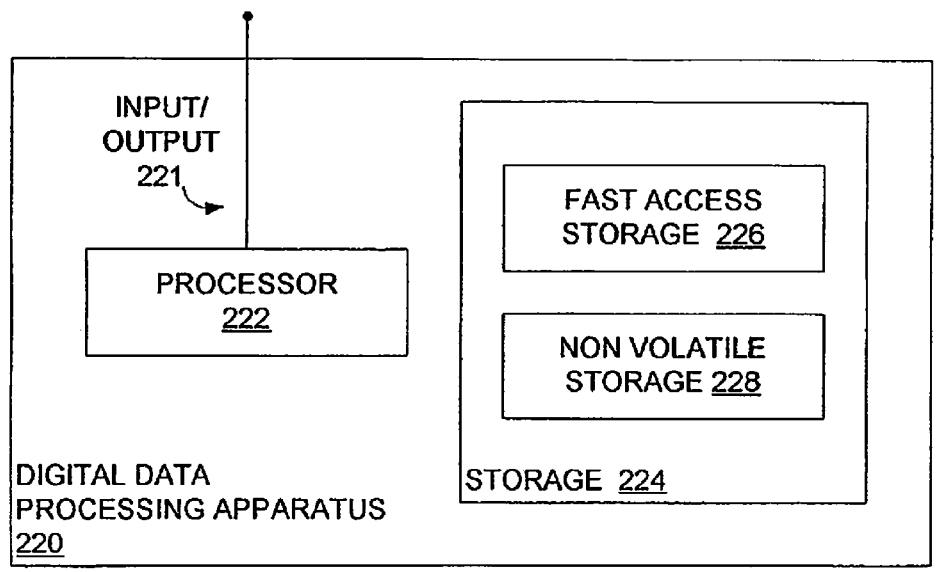
FIG. 2A is a block diagram of a digital data processing machine according to one embodiment of the invention.
Figure 2B:
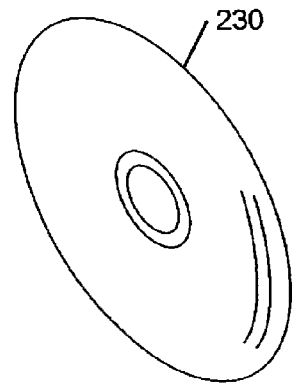
FIG. 2B shows an exemplary storage medium according to one embodiment of the invention.

As a more specific example, FIG. 2A shows a digital data processing apparatus 220. The apparatus 220 includes a processor 222, such as a microprocessor, personal computer, workstation, controller, microcontroller, state machine, or other processing machine, coupled to a digital data storage 224. In the present example, the storage 224 includes a fast-access storage 226, as well as nonvolatile storage 228. The fast-access storage 226 may be used, for example, to store the programming instructions executed by the processor 222. The storage 226 and 228 may be implemented by various devices, such as those discussed in greater detail in conjunction with FIGS. 2B-2C. Many alternatives are possible. For instance, one of the components 226, 228 may be eliminated; furthermore, the storage 224, 226, and/or 228 may be provided on-board the processor 222, or even provided externally to the apparatus 220.

The apparatus 220 also includes an input/output 221, such as a connector, line, bus, cable, buffer, electromagnetic link, network, modem, transducer, IR port, antenna, or other means for the processor 222 to exchange data with other hardware external to the apparatus 220.

Storage Media

Various instances of digital data storage may be used to provide storage, such as the memory 210, to embody the storage 224 and 228 (FIG. 2A), etc. Depending upon its application, this digital data storage may be used for various functions, such as storing data, or to store machine-readable instructions. These instructions may themselves aid in carrying out various processing functions, or they may serve to install a software program upon a computer, where such software program is then executable to perform other functions related to this disclosure.

In any case, the storage media may be implemented by nearly any mechanism to digitally store machine-readable signals. One example is optical storage such as CD-ROM, WORM, DVD, digital optical tape, disk storage 230 (FIG. 2B), or other optical storage. Another example is direct access storage, such as a conventional "hard drive", redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor can read information from, and write information to, the storage medium. In the alternative, the storage medium may be integral to the processor. In another example, the processor and the storage medium may reside in an ASIC or other integrated circuit.

Logic Circuitry

Figure 2C:
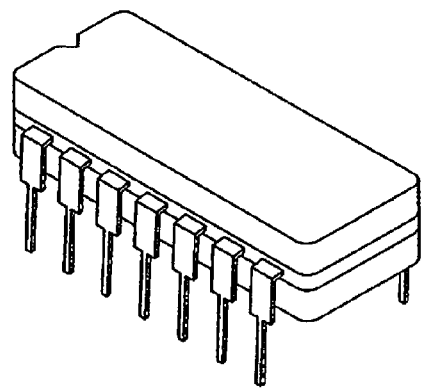
FIG. 2C is a perspective view of exemplary logic circuitry according to one embodiment of the invention.

In contrast to storage media that contain machine-executable instructions, as described above, a different embodiment uses logic circuitry to implement processing features described herein. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like. FIG. 2C shows an example of logic circuitry in the form of an integrated circuit 240.

Edit Distance Combined with Regional Correction

Edit-Distance is the number of operations required to turn one string into another string. Essentially, this is the number of edits one might have to make, e.g. manually with a pen, to fix a misspelled word. For example, to fix an input word "ressumt" to a target word "result", two edits must be made: an 's' must be removed, and the 'm' must be changed to an 'l'. Thus, "result" is edit-distance 2 from "ressumt".

A common technique to determine the edit-distance between an input word and a target word uses a matrix as a tool. (See FIG. 3.) The approach compares characters in the input word with characters in the target word, and gives the total edit-distance between the words at the bottom-right-most element of the matrix. The details of the calculation are complex, but in general the edit-distance (represented by the number in the diagonal elements) increases as the portions of the words start to look dissimilar (and smaller value means more similar). Working across the matrix from upper left to lower right, if a character in the target word is the same as the character in the input word, edit-distance does not increase. If the character in the target word is not the same, the edit-distance increases according to a standard rule. The end result, the total edit-distance, is the bottom-right-most element (bold outline).

That idea was now extended to ambiguous input where each input corresponds to a set of characters rather than single characters. One example of this is a text entry system on a mobile phone that allows a user to press keys corresponding to the characters the user wants to input, with the system resolving the ambiguity inherent in the fact that keys have multiple characters associated with them. The new term "Set-Edit-Distance" refers to the extension of the edit-distance idea to ambiguous input. To illustrate set-edit-distance, suppose that a user of a mobile phone text entry system presses the key (7, 3, 7, 7, 8, 6, 8) while attempting to enter the word 'result.' Spell correction on this ambiguous system looks for words that have the smallest set-edit-distance to the input key sequence. The technique is similar to that for edit-distance, but instead of comparing a character in the target word to a character in the input sequence, the character in the target word is compared against a set of characters represented by the input key. If the target character is in the input set, the set-edit-distance does not increase. If the target character is not in the input set, the set-edit-distance does increase according to a standard rule. A matrix corresponding to set-edit-distance is shown in FIG. 4, with the result in the bottom-right-most element (bold outline).

The example in FIG. 4 uses key input on a mobile phone to illustrate the concept of set-edit-distance, but this idea applies to other ambiguous systems as well, such as a set of characters surrounding a pressed key on a QWERTY keyboard, or a set of characters returned from a character recognition engine. Also, the example above assumes that the characters in the set are all of equal likelihood, but the system can be extended to incorporate character probabilities in the final set-edit-distance score.

In such an extended system, the input sequence may be represented as an array of one or more character+ probability pairs. The probability reflects the likelihood that the character identified by the system is what the user intended. As described in Robinson et al, Handwriting And Voice Input With Automatic Correction, U.S. Pat. No. 7,319,957 (Jan. 15, 2008) and Robinson, et al., Handwriting And Voice Input With Automatic Correction, U.S. patent application Ser. No. 11/043,525 (filed Jan. 25, 2005), each of which is incorporated herein in its entirety by this reference thereto. The probability may be based upon one or more of the following:

The Cartesian distance from a stylus or finger tap location to the center of each adjacent letter on a keyboard displayed on a touch screen, the frequency of the adjacent letter, and/or the distribution of taps around each letter;

The radial distance between a joystick tilt direction to the assigned pie slices of nearby letters of the alphabet;

The degree of similarity between the handwritten letter and a set of possible letter shapes/templates, e.g., the "ink trail" looks most like the letter 'c' (60% probability), but may be other letters as well, such as 'o' (20%), 'e' (10%), 'a' (10%); and The probability that a letter/grapheme is represented in a phoneme or full-word utterance processed by a speech recognition front-end.

Therefore, set-edit-distance is the standard edit distance applied to ambiguous sets, where penalties are assigned to each difference between an entered and a target vocabulary word. Instead of asking "Is this letter different?" the question is asked: "Is this letter one of the possible candidates in the probability set?"

Thus, an embodiment applies the following algorithm:
If there are two possible transformations that result in a match, choose the one with the lowest edit distance.
If the letter is in the input's probability set, also calculate the regional-correction probability score for that letter.
Accumulate all regional-correction probability scores for all letters in the word to calculate the spell correction tap frequency.

For zero-set-edit-distance words, i.e. same word length and each letter in the vocabulary word is present in the inputs' probability sets, only the tap frequencies are used.

A number of values are calculated or accumulated for the matching and word list ordering steps:
1. Set-edit-distance;
2. Tap frequency, of comparison;
3. Stem edit-distance;
4. Word frequency; and
5. Source, e.g. dictionary.

Tap frequency (TF) of the word or stem may be calculated as:

$$TF=\text{probability of letter 1*probability of letter 2*} \ldots \quad (1)$$

This is similar to the standard probability set auto-correction calculations, but where the edit distance algorithm creates alternatives then the largest calculated frequency among these alternatives is chosen.

The example in FIG. 4 uses a comparison between a set-based input sequence and an entire target word. This idea can also be applied to compare a set of inputs against the beginning (stem) of a target word. This allows the system to start to predict spell corrections before the user has entered the entire input sequence. This is called stem set-edit-distance. FIGS. 5A-5B illustrate partial input sequences. In these figures, letters 'a' and 's' may be members of the same set based on physical proximity on a touch screen QWERTY keyboard, whereas 's' and 'g' are not. Because the letter 's' in the third position of the target word is in the set for the third input in FIG. 5A, the stem set-edit-distance between the input and target word is zero. Because the third letter 's' is not in the same set for the third input in FIG. 5B, the stem set-edit-distance between the input and target word is one.

Stem edit-distance is an edit distance value for the explicitly-entered or most probable characters, commonly the exact-tap value from each input probability set, compared with the corresponding letters of a longer target word. In this case, the most probable character from each input for a touch screen QWERTY keyboard is the exact-tap letter. Because the letter 's' in the third position of the target word is not the same as the exact-tap value for the third input in FIG. 5A, the stem edit-distance between the input and target word is one. Similarly, the stem edit-distance between the input and target word in FIG. 5B is also one.

The sets for stem set-edit-distance can also be language specific. For example, accented variants of a character in French may be members of the same set. FIG. 5C illustrates an example where variants of 'e' map to the same key, resulting in a stem set-edit-distance of zero between the input and target word.

An embodiment of the invention also provides a number of innovative strategies for tuning the ordering of words in the selection list to mirror the intent or entry style of the user. For example, the results may be biased in one of two ways:

Full-Word Priority—for a poor keyboard, e.g. crowded or with low tactile feedback, and/or a fast or sloppy typist, the results emphasize regional, i.e. near-miss, corrections of all inputs and fewer word completions; and Completions Promoted—for a good/accurate keyboard, and/or a slow, careful typist who may be looking for completions to boost throughput, the results emphasize word completions based on the, i.e. exact-tap, input sequence so far.

An embodiment of the invention provides typing correction and spell-check features that allow such systems as those which incorporate the "Sloppy Type" technology described above to be more useful to all typists, particularly on non-desktop devices. A "Sloppy Type" system provides an enhanced text entry system that uses word-level disambiguation to automatically correct inaccuracies in user keystroke entries. Specifically, a "Sloppy Type" system provides a text entry system comprising: (a) a user input device comprising a touch sensitive surface including an auto-correcting keyboard region comprising a plurality of the characters of an alphabet, wherein each of the plurality of characters corresponds to a location with known coordinates in the auto-correcting keyboard region, wherein each time a user contacts the user input device within the auto-correcting keyboard region, a location associated with the user contact is determined and the determined contact location is added to a current input sequence of contact locations; (b) a memory containing a plurality of objects, wherein each object is a string of one or a plurality of characters forming a word or a part of a word, wherein each object is further associated with a frequency of use; (c) an output device with a text display area; and (d) a processor coupled to the user input device, memory, and output device, said processor comprising: (i) a distance value calculation component which, for each determined contact location in the input sequence of contacts, calculates a set of distance values between the contact locations and the known coordinate locations corresponding to one or a plurality of characters within the auto-correcting keyboard region; (ii) a word evaluation component which, for each generated input sequence, identifies one or a plurality of candidate objects in memory, and for each of the one or a plurality of identified candidate objects, evaluates each identified candidate object by calculating a matching metric based on the calculated distance values and the frequency of use associated with the object, and ranks the evaluated candidate objects based on the calculated matching metric values; and (iii) a selection component for (a) identifying one or a plurality of candidate objects according to their evaluated ranking, (b) presenting the identified objects to the user, enabling the user to select one of the presented objects for output to the text display area on the output device.

Optimizations

Theoretically, any word in a vocabulary could be considered to be a correction, given a large enough edit distance score. However, database processing must occur in real-time as the user is typing, and there is a limit to the available processing power and working memory, especially for mobile devices. Thus, it is important to optimize all parts of the combined edit distance algorithms and eliminate processing steps when possible. For example, a first-level criterion for discarding a possible word match is allowing only one edit/correction for every three actual inputs, up to a maximum of three edits against any one compared word.

Other performance enhancements can include, for example (without limitation):

Strategies for minimizing edit distance calculations, e.g. first pass calculating cells which may allow a comparison to be rejected entirely.

The system starts from the results of a previous pass, such as when the user inputs another letter; or temporarily whittles down the previous word list, e.g. showing a shortened, partial, or even blurred selection list, until the user pauses entry.

Levels of filtering, e.g. most to least strict, are applied before, during, or after edit distance matrix calculations are completed, e.g.:

First letter exact, otherwise withdraw target word from consideration;

First letter near-miss, regional, in probability set;

The first letter of the vocabulary word must match one of the first two inputs, e.g. allows one add, one drop, or one transposed pair;

The first letter of the vocabulary word must be in the probability set of one of the first two inputs;

Other filtering concepts and variations may be applied; and

No filtering.

Word Frequency may be approximated, based on Zipf's Law, which states that given some corpus of natural language utterances, the frequency of any word is inversely proportional to its rank in the frequency table. Thus, the most frequent word occurs approximately twice as often as the second most frequent word, which occurs twice as often as the fourth most frequent word, etc. In an embodiment, the approximation is used, rather than a value stored for each word in a vocabulary database:

$$F_n = F_1/n \text{(frequency of } N\text{th word is frequency of 1st word divided by word position} \quad (2)$$

Other tunable configuration parameters may include:

Number of word completions per near-miss section;

Number of spell corrections; and

Spell correction mode, either standard edit-distance or set-edit-distance (with or without letter probabilities).

Spell Correction Performance

Spell correction on a large word list is a very CPU intensive task, and even more so when memory is limited. Thus, to reach acceptable performance the whole system must be optimized based on the spell correction characteristics chosen. The resulting system thus becomes quite inflexible from a feature perspective. Without specific optimizations performance may be a magnitude or two worse.

Spell correction performance depends mostly on the following:

Spell correction properties, like allowed edits, modes, and filters

The "fuzzy compare" function (that decides if a word matches the input or not)

The low level LDB search function

The LDB format (structure and behavior)

The number of words in the LDB and their length distribution

How ambiguous the KDB is for the LDB

Each of these elements are described in more detail in the following sections.

Spell Correction Properties

Allowed Edits

The number of allowed edits is a very important performance factor. The more edits the more ambiguity in the compare and thus many more words match and go into the selection list for prioritization. If the compare is too generous the effect is that too many unwanted words get into the list.

In a preferred embodiment, the number of allowed edits is related to input length and one edit is granted for every third input up to a maximum of three. This parameter of one edit per three inputs is assumed throughout the examples below.

Modes and Filters

Modes and filters are used to control the result set as well as performance. Two examples of modes are exact input and regional. On a touch screen soft keyboard, for example, the user can tap exactly on the desired letter as well as indicating an approximate region of letters. In exact input mode, only the exact-tap letter from each user input is considered. In regional mode, some or all of the nearby letters indicated by each user input are considered.

Spell correction against exact input reduces ambiguity and makes the candidates look more like what's entered (even if what is entered is incorrect). It is effective with KDBs that feature exact-tap values, such as touch screen soft keyboards. Twelve key systems (for standard phone keypads) may have no useful exact-tap value; each key press may be represented by the key's digit instead of one of the letters, and there is no way to intuit that one letter on each key is more likely than the others to be the intended one.

Unfortunately for twelve key systems, the KDBs behave as a generous regional mode layout, i.e. each input produces at least 3 letters per set, often many more when accented vowels are included, while not having an exact-tap value that can be used for exact input mode and filtering.

A filter is a screening function that ends further consideration of a candidate word if it does not meet established minimum criteria. For example, the ONE/TWO filters are mostly for performance improvement, making the first character in the word correlate stronger with the first or second input and rejecting any candidate words that do not conform.

The "Fuzzy Compare" Function

The fuzzy compare function allows a certain difference between the input and the word being compared, the edit distance. The idea is to calculate the edit distance and then based on the value either pass or reject the word.

Calculating the exact edit distance is expensive performance-wise. A solution to that is to place a screening mechanism prior to the real calculation. It is acceptable to "under" reject within reason, but "over" rejection should be avoided if at all possible. Words that pass through screening because of "under rejection" is taken out later, after the real distance calculation.

The quick screening is crucial for maintaining acceptable performance on each key press. Potentially a huge amount of words can be coming in for screening and normally only a fraction gets through. Thus, for good performance everything before the screening must also be very efficient. Things done after the screening is less important performance wise, but there is still a decent amount of data coming through, especially for certain input combinations where thousands of words makes it all the way into the selection list insert function.

In one or more embodiments, spell correction works alongside the probability set comparison logic of regional autocorrection. There are words that are accepted by set comparisons that are not accepted based on the spell correction calculation. This is the case for regional input when spell correction is set up in exact input mode or when using exact filters. Word completion is also simpler for classic compare while costing edits in spell correction.

Figure 6:
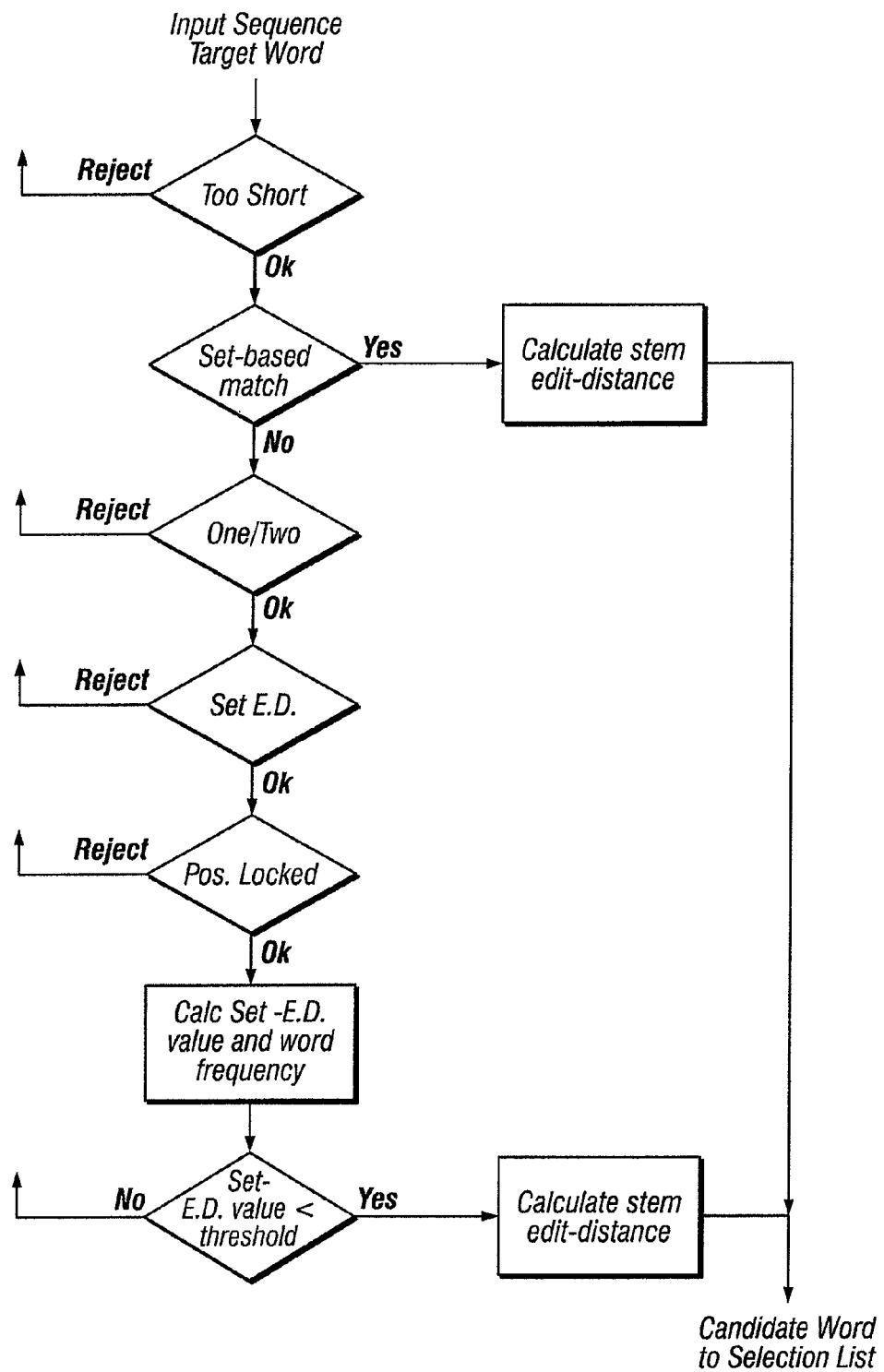
FIG. 6 is a flow diagram showing the steps for performing set-edit-distance calculations and incremental filtering to identify a candidate word according to one embodiment of the invention.

In the preferred embodiment, the fuzzy compare steps are:
1. Screen for too short words
2. Screen for set-based match
3. Calculate stem edit-distance
4. Screen for ONE/TWO
5. Screen for set-edit-distance
6. Screen for position-locked characters
7. Calculate set-edit-distance and frequency
8. Calculate stem edit-distance These steps are illustrated as a flow diagram in FIG. 6, representing one implementation of the calculations 130 in FIG. 1.

Screening for classic compare and dealing with word completions, etc., is placed at step 2 before further spell correction calculations. That takes all the "classic" complexity out of the subsequent code. It also means that when spell correction is turned off, all other calculations can be skipped.

The algorithm is pictured as comparing two words against each other. In most embodiments this is generalized so that one word corresponds to the input symbols. In the sample matrixes in the figures referenced below, the input sequence is shown vertically. Thus, rather than each input word position being a single character as with standard Edit Distance, it is really a set of characters corresponding to ambiguous or regional input. A compare yields a match if any of the characters in the set is a match.

1. Screen for Too Short Words

If a word is too short even for spell correction, that is, shorter than the input length minus the available edit distance, then it can be rejected immediately.

2. Screen for Set-Based Matches

This is an iteration over the input sequence, verifying that each position is a match to the corresponding position in the compared word; i.e. each letter in the candidate word must be present in each input set.

If there is a non-match and the word is too long for spell correction, i.e. if it is longer than the input length, plus the available edit distance, then it can be rejected immediately.

3. Calculate Stem-Edit-Distance

This is an iteration over all symbols in the input sequence, and is only performed when there is a set-based match. Every difference from an exact-tap value increases the stem distance; e.g. the candidate word "tomorrow" might have a stem distance of 0 for an exact-tap input of "tom" and 1 for "tpm". The word tap frequency is also calculated during the iteration.

If it is a valid classic match, the "fuzzy compare" of the candidate word is complete at this point. The candidate word is inserted into the selection list.

4. Screen for ONE/TWO

This is a quick check to see if the first character in the word matches the first ONE or TWO input symbols. If not, then the word is rejected.

5. Screen for Set-Edit-Distance

Conceptually this is a very simple task because enhanced edit distance follows the traditional definition using insert, delete, and substitution plus transpose (the last is commonly included for text entry correction). Doing it in an efficient way is much harder though.

The traditional way of calculating edit distance is using a matrix. An example is shown in FIG. 7. All edges (grey numbers) are predefined and always the same. The rest is calculated by traversing left-to-right and top-to-bottom, columns first. Each individual position is calculated by taking the minimum of the values that corresponds to insert, delete, substitute, and transpose. The substitute and transpose values are conditioned on whether there is a match for those positions. The resulting edit distance is found in the lower right corner, "2" in this case.

To find the values based on the cell that is being calculated, i.e. the cell marked with 'X' in FIG. 8: The cost for taking the substitution ('S') cell is zero or one depending on if there is a match. The transpose ('T') cell can only be taken if both characters, i.e. the current and preceding characters, match and then the cost is one. Insert ('I') and delete ('D') are also a cost of one each. Thus, the cell's cost is the already calculated cost for that cell plus the additional cost just mentioned.

This is computationally a very expensive way to calculate the distance, especially with long words. In one embodiment, a maximum allowable edit distance is set and so that 1% or less of the words pass that limit. If the allowed distance is too high the whole word list might make it into the selection list and the whole idea of spell correction is lost. Thus, initially the exact distance is not of concern; rather just whether the result is below or above the rejection limit. For those few words that pass this test more effort can then be spent on calculating exact distance, frequency, etc.

The goal of the screening step is to, as quickly as possible, prove that the resulting distance is above the rejection limit.

Consider the situation when the compared words match, except for length, as shown in FIG. 9. It is not possible for any of the cells to have a value that is lower. Comparing length 6 and length 9 words results in an edit distance of 3, as expected.

This initial matrix can be used when calculating any two words. Only the values in cells that are actually chosen for comparison need be updated along the way. The goal becomes to push the lower right cell above its rejection limit. To do so, it must be proven that any of the cells it relies on to get this value actually has a higher value, and so on recursively.

For this example, with length difference 3 and the first character not matching (changing the first 'x' to 'y' in FIG. 10A), rejection can be proved by only calculating four cells; the rest of the related cell updates are implicit. The iterations in FIG. 10B show the recalculated cells (bold outline) and the effect on other dependent cells at each iteration.

The result is that the center diagonal and those towards the diagonal with the result value get increased values. This happens every time the last cell, that supports the lowest value in another cell, gets increased as a result of a completed compare mismatch.

The shown matrixes only describe what happens when there is a word length difference. If the length difference is zero, the center diagonal becomes the main one and the support, i.e. a cell value high enough to affect the calculation, must come from both sides of the result diagonal to prove a reject.

Diagonals in computations make data access patterns harder to optimize (accessing actual memory corresponding to the positions). Operating in a rotated/transformed matrix space is a further optimization; see FIG. 11. The cells in the center diagonal (bold outline) become a single row. The new "9"s (shown in grey) are added to support default values for edge cells, i.e. a value sufficiently large that if referenced it immediately exceeds the maximum possible edit-distance. In this transformed space the cell calculation relationships change as shown in FIG. 12.

6. Screen for Position-Locked Characters

Because a full classic compare was not performed on a spell correction candidate, there is still a need to verify input symbols that have locked positions, i.e. not allowed to move or change value. This is just an iteration over input symbols with locked positions, checking that they match. If not, then the word is rejected.

7. Calculate Set-Edit-Distance and Frequency

The algorithm to screen for edit distance can be modified to calculate the edit distance and other things such as word frequency. It should not, however, be merged into the screening code. That code has to be kept separate and optimized for pure screening. A different version gets applied to the words that pass the screening, one that is more exhaustive because it has to evaluate different cells and pick the best choices for low distance and high frequency. It also has to deal with things, such as possible locked symbol values (just value, not position).

Candidate is rejected if the set-edit-distance value exceeds a certain threshold.

8. Calculate Stem Edit-Distance

This is also a modified copy of the screening algorithm, for two reasons:

First, the stem distance can be very different because it is always based on the exact match. Thus, the value can become higher than the intended maximum for distance. Distance values higher than the maximum might not be fully accurate because of algorithm optimizations, but it is still good enough.

Second, the stem distance is also different in that it might not take into account the full length of the candidate word. To be compatible with non spell corrected words, the stem distance calculation will stop at the length of the input. Some additional checking is needed around the end cell to get the minimum value depending on inserts and deletes.

Low Level LDB Search Function

The fuzzy compare function can be made very efficient in screening and calculation, but that alone is not enough for good performance, particularly on embedded platforms. Depending on the input, almost all words in a vocabulary can be potential spell correction candidates. This usually happens when entering the 9th and 10th inputs in most languages, when one edit is allowed per three inputs.

At input length 9 all words with length 6-12 are potential spell correction candidates and everything longer than 12 are potential completion candidates. For example, at input length 9, over 70% of a Finnish vocabulary might be considered for comparison based on spell correction and another 20% based on word completion. This creates significant efficiency problems since spell correction requires the most computational effort. The following strategies seek to increase the efficiency of the database retrieval process by integrating one or more of the screening functions described earlier.

Search Strategy for No Spell Correction

The preferred embodiment of the vocabulary database, as described in Unruh; Erland, Kay; David Jon, Efficient Storage and Search Of Word Lists and Other Text, U.S. patent application Ser. No. 11/379,354 (filed Apr. 19, 2006) which is incorporated by reference, is designed and optimized for searching words without spell correction. The whole input length is directly mapped to interval streams and the sparsest streams are visited first to aid quick jumping in the word list. Once there is a match, completion characters can be picked up from streams not mapped to the input.

With this strategy too short words are automatically skipped because they do not have characters matching the corresponding input.

Search Strategy for Spell Correction

With spell correction the words in the LDB falls into three categories depending on the input length. These are:

Too short words

Long words that can become completions

Words applicable for spell correction (certain length difference from the input length)

Each of these categories are described in the following sections.

Too Short Words

These can easily be skipped over by checking the interval stream corresponding to the last character in the shortest allowed word; For example, if the minimum length is 6, then the 6th interval stream must not be empty (have the terminating zero); if empty, then it is possible to directly jump to the end of the interval.

Long Words

Just as a special interval stream can be used to check for too short words another stream can be used to check for long words. For example, if the maximum length is 12, then the 13th stream decides if a word is long or not.

Long words can be handled exactly the same way as if spell correction was turned off. Streams mapped to the input can be used for jumping and the completion part is picked up from the rest of the streams.

Spell Correction Words

Unlike the previous two categories which can be efficiently searched, all words that fall into this category basically have to be sent on for edit distance calculation. That is not feasible, performance-wise, though screening function is needed at the LDB search level. As long as it provides a performance gain, this screening can be quite under-rejecting.

A complicating factor is that the spell correction modes and filters might operate in exact mode while the input still is set-based, and thus non-spell correction candidates might be set-based matches while spell correction ones cannot use set-based info. The consequence is that any screening process must adhere to the set-based comparison logic as well.

An aspect of the LDB retrieval screening function for a preferred embodiment is illustrated in FIG. 13. With set-based comparison logic, the target word does not match the input sequence because the 4GHI key does not include "d" in its set. But the set-edit-distance comparison logic allows for any input to be inserted, deleted, or transposed. Therefore, the set represented by each input expands to the union of sets including adjacent keys. The number of adjacent keys included depends on constraint parameters such as the number of allowed edits.

Many of the screening functions from the fuzzy compare function may be adapted and integrated into the database retrieval process, as described in the following paragraphs.

Filter ONE/TWO

Filter ONE and TWO can be used for jumping. If interval stream zero (first character in the word) does not match the corresponding input (first or second input, depending on the filter) a jump can take place.

If the filter setting (exact input or regional) does not match the set-based comparison logic, then it must be accompanied by a failing stream. The resulting jump is limited to the shorter of the two (nearest end in one of the two streams). This filter only applies to spell correction candidates.

Input Based Screening

Even though the available edits can make words match, that look quite different than the input, there are still limitations on what can match. A limited number of available edits means that only a limited number if inserts and deletes can be applied, and thus there is a limitation in how far away a character in a word can be from the input related stream and still count as a match.

This screening can be applied independent of filters, but the filters can be made part of the screening in an efficient way. The screening must be very fast, so the complexity must be kept low.

To reject a word, one miss more than the available number of edits is needed. For example, for edit distance 3, 4 misses must be found. If there are 9 inputs and the compared word has length 6, compare up to length 9 because position 7, 8 and 9 have the zero as termination code and that always fails to compare with any input union. If the word is longer than the input, compare up to the length of the word.

Length-Independent Screening

One solution to screening when the word length is not predetermined is to set up a second, fabricated, input that can be used for screening matching. It is fabricated in a way so that every position becomes a union of the surrounding original positions.

For input length 9, the union map looks like that shown in FIG. 14. Every "Ixx" row is a position in the input. Each column is a position in the word that's being compared. For example, the fourth character in the word might match any of the first 7 inputs and would not count as a used edit. The 12th character can only match the 9th input though, so that is much more restrictive.

If any character in the word fails to match the union it counts as a miss and thus calls for a potential edit. With enough misses the word can be discarded by this screening.

If a word is shorter than the input, then that difference can be subtracted from available edits immediately and the comparison only needs to check the available positions. Thus, if the length difference is the same as the number of available edits, only one position has to fail to reject the word.

The same restrictions apply here as it did for the filters. If there is an exact/regional significance then a rejection must be accompanied by a failing set-based interval stream.

The longest possible jump is to the nearest end of a failing interval stream, whether union or set-based.

Because there is a requirement for a failing set-based stream to exist to be able to make a jump, there is no need to further restrict the jump with regards to change in word length category.

Length-Dependent Screening

In the preferred embodiment of length-dependent screening, calculating the length of the compared word can restrict the unions to what is applicable for that length. For example, for length 6 and input length 9 the union map look like that of FIG. 15.

This features more limited unions, but with the added cost of finding the word length to choose the unions. It also limits the possible jump length to within a chunk of words with the same length because, as soon as the length changes, so does the unions. Thus, it is also a requirement to minimize the number of word length changes throughout the LDB.

Apart from having length dependent patterns, the description of independent screening applies here as well.

Selection List Ordering Strategies and Algorithms

The result of the combined algorithms is a list of word choices for selection that includes, in most likely order, either of 1. the word that the user has already typed, if the input sequence is complete, or 2. the word that the user has begun to type, if the input sequence represents the stem of a word or phrase.

The word list sort order may be based on factors of regional probability, edit distance, word recency/frequency (as stored in each database), word length, and/or stem edit distance. Word list ordering may also depend on which of two or more different list profiles or strategies is being used. For example:

Full-Word Priority
1. Full word always comes before word completion;
2. Source dictionary, e.g. main vocabulary, contextual, user-defined, recency ordered, plug-in, macro substitution;
3. Edit distance, e.g. smaller value ahead of greater;
4. Stem edit distance, e.g. smaller first; and only if Edit Distance>0 and the same for both word choices;
5. Frequency, e.g. largest first; Tap Frequency× Word Frequency.

Note the order of evaluation is as above, e.g. criterion 3 is only considered if criterion 2 is the same for the compared items. Because of this, for example, spell corrections on custom user words can appear ahead of regional corrections for standard vocabulary words.

Word Completions Promoted
1. Stem edit distance;
2. Word completion or not;
3. Source;
4. Edit distance;
5. Frequency.

Because stem edit distance is the first criterion, completion is the second, etc., the word list effectively gets segmented as:
full word with 0 misses, the exact-tap input sequence is the same as the word
completion(s) with 0-miss stem(s)
full word(s) with 1 near-miss
completion(s) with 1 near-miss stem(s)
. . .

The system may allow the basic strategy to be specified. It may also automatically adapt the ordering based on recognized patterns of word selection, over and above the frequency/recency information recorded in the source databases. For example, the system may detect that most of the time the user selects a word completion whose first letters exactly match the input so far, and so may shift the word list ordering bias towards the "Completions Promoted" profile.

Figure 16:
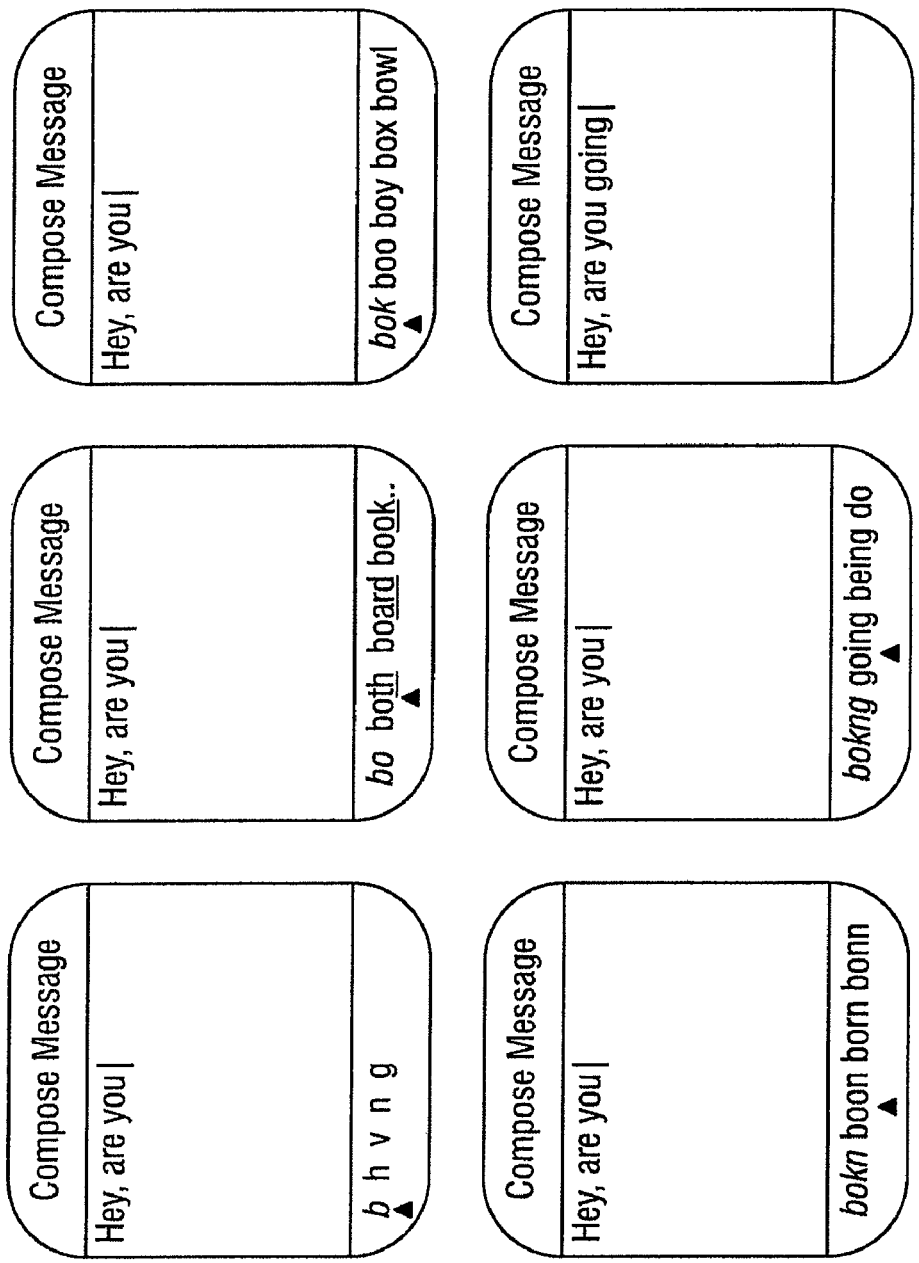
FIG. 16 is a series of screen diagrams showing set-edit-distance spell correction with regional auto-correction according to one embodiment of the invention.

FIG. 16 illustrates a sample user interface during operation of an embodiment of the invention; in this case, showing set-edit-distance spell correction with regional auto-correction. In this embodiment on a mobile device, the candidate words appear across the bottom of the screen upon each user input. The string at the left, shown in italics, is the exact-tap letter sequence, which for this device is each key pressed on its QWERTY thumb board. The arrowhead indicates the default (highest ranked) word choice. The second screen shows three word completions offered after the keys "b" and "o" have been pressed. The third screen shows "bowl" as a candidate, which is a close match to the input sequence "bok" if the letter "w" is inserted (standard edit-distance of 1) in the middle and the "l" is adjacent to the "k" on the keyboard (using regional auto-correction). The fifth screen shows "going" as the default word choice, because the "g" and "i" are each adjacent to the inputs of "b" and "k"; shown as second word choice is "being", which substituted "e" for the "o" (edit-distance of 1). The correction parameters of this embodiment penalize regional auto-correction differences less than edit-distance differences.

Other Features and Applications

Auto-substitution, e.g. macros: Regional and spell correction may both apply to the shortcut, although word completion can apply to the expanded text. Thus, if an input sequence approximately matches both the shortcut and the stem of the expanded text, the ranking of the macro may be increased. Macros may be predefined or user-definable.

Keyword flagging, for advertising purposes, could benefit from auto-substitution and/or spell correction. For example, if the word in the mobile message was text slang or misspelled, embodiments of the invention could still find a valid sponsored keyword.

An embodiment of the invention could be applied to an entire message buffer, i.e. batch mode, whether its text was originally entered ambiguously or explicitly, e.g. via multi-tap, or received as a message or file from another device.

The spell-corrected word choice can become the basis for further inputs, word completions, etc., if the input method permits auto-extending a word choice, including build-around rules with punctuation, etc. In one embodiment, a cascading menu pops up with a list of word completions for the selected word or stem.

Embodiments of the invention can also be applied to ambiguous entry for search and discovery. For example, if the user's input sequence is not closely matched by the content of the mobile device or the contents of server-based search engines, one or more spell-corrected interpretations which do result in matches may be offered.

While the examples above illustrate the use of embodiments of the invention with Latin-based languages, other embodiments may address the particular needs of other alphabets or scripts.

Application to Trace Input

Introduction

As an enhancement to the disclosure set forth above, the hardware, software, firmware, circuitry, and other features set forth herein may be configured to employ "trace" technology. With trace technology, the user traces a single, continuous path through (or nearly through) the desired characters in an input words, and the predictive technology of the system 200 figures out what word is being entered and displays it on the screen 203. If there are multiple words that can be predicted from the traced path, the system 200 offers a list of options.

Trace technology is explained further in publications such as the following patent documents assigned to Nuance Corporation or its subsidiaries: (1) U.S. Pat. No. 7,175,438 entitled FAST TYPING SYSTEM AND METHOD issued Feb. 13, 2007 in the names of Levy; (2) U.S. Pat. No. 7,251,367 entitled SYSTEM AND METHOD FOR RECOGNIZING WORD PATTERNS BASED ON A VIRTUAL KEYBOARD LAYOUT, issued on Jul. 31, 2007 in the name of Zhai; (3) U.S. Pat. No. 7,487,461 entitled SYSTEM AND METHOD FOR ISSUING COMMANDS BASED ON PEN MOTIONS ON A GRAPHICAL KEYBOARD, issued Feb. 3, 2009 in the names of Zhai et al.; (4) U.S. Pat. No. 7,706,616 entitled SYSTEM AND METHOD FOR RECOGNIZING WORD PATTERNS IN A VERY LARGE VOCABULARY BASED ON A VIRTUAL KEYBOARD LAYOUT, issued Apr. 27, 2010 in the names of Kristensson et al.; (5) U.S. Publication No. 2008/0270896 entitled SYSTEM AND METHOD FOR PREVIEW AND SELECTION OF WORDS, published Oct. 30, 2008 in the name of Kristensson; (6) U.S. Publication No. 2007/0094024 entitled SYSTEM AND METHOD FOR IMPROVING TEXT INPUT ON A SHORTHAND-ON-KEYBOARD INTERFACE, published Apr. 26, 2007 in the names of Kristensson et al. The entirety of each foregoing document is hereby incorporated herein by reference.

Figure 17:
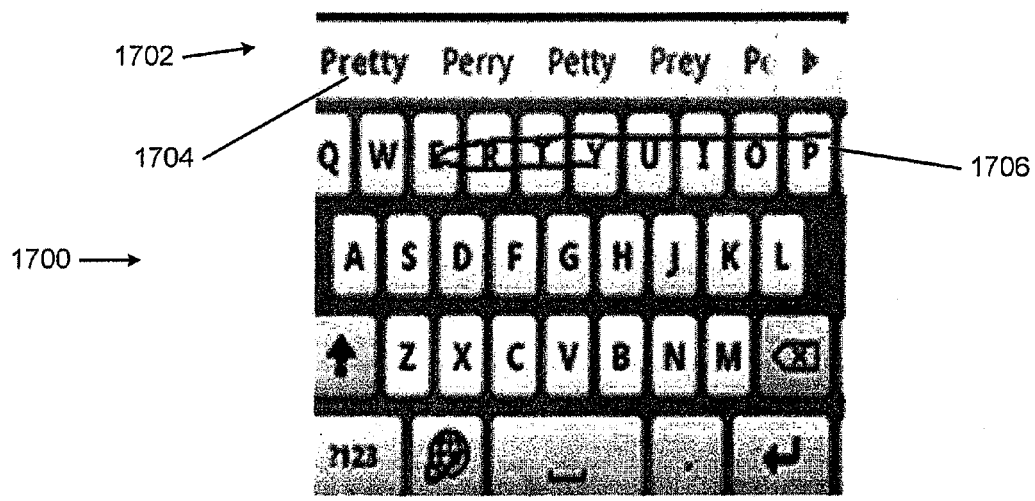
FIG. 17 is a screenshot of a keyboard showing a trace according to one embodiment of the invention.

FIG. 17 is partial screenshot of a soft keyboard 1700. A traced pattern 1706 illustrates the user's entry of the word "pretty," including a trace through the letters P-R-E-T-T-Y, in order. The traced pattern may also be referred to as a traced path or a trace, without any intended limitation. In operation, the keyboard 1700 displays some or all of the trace 1706 to show feedback. The trace 1706 follows the user's finger or stylus. In this example, the trace disappears or fades when the user lifts the finger or stylus. In one example, the length of the displayed portion of the traced 1706 may vary according to the speed of movement of the user's finger or stylus. In a different embodiment, the keyboard 1700 does not display the trace 1706. In a top region 1702, the keyboard 1700 displays some potential words matching the user's trace 1706, including PRETTY, PERRY, PETTY, AND PREY.

In order to use trace technology with spell correction technologies such as those described above, various changes or additions may be employed, according to embodiments summarized below.

Operating Sequence

Figure 24:
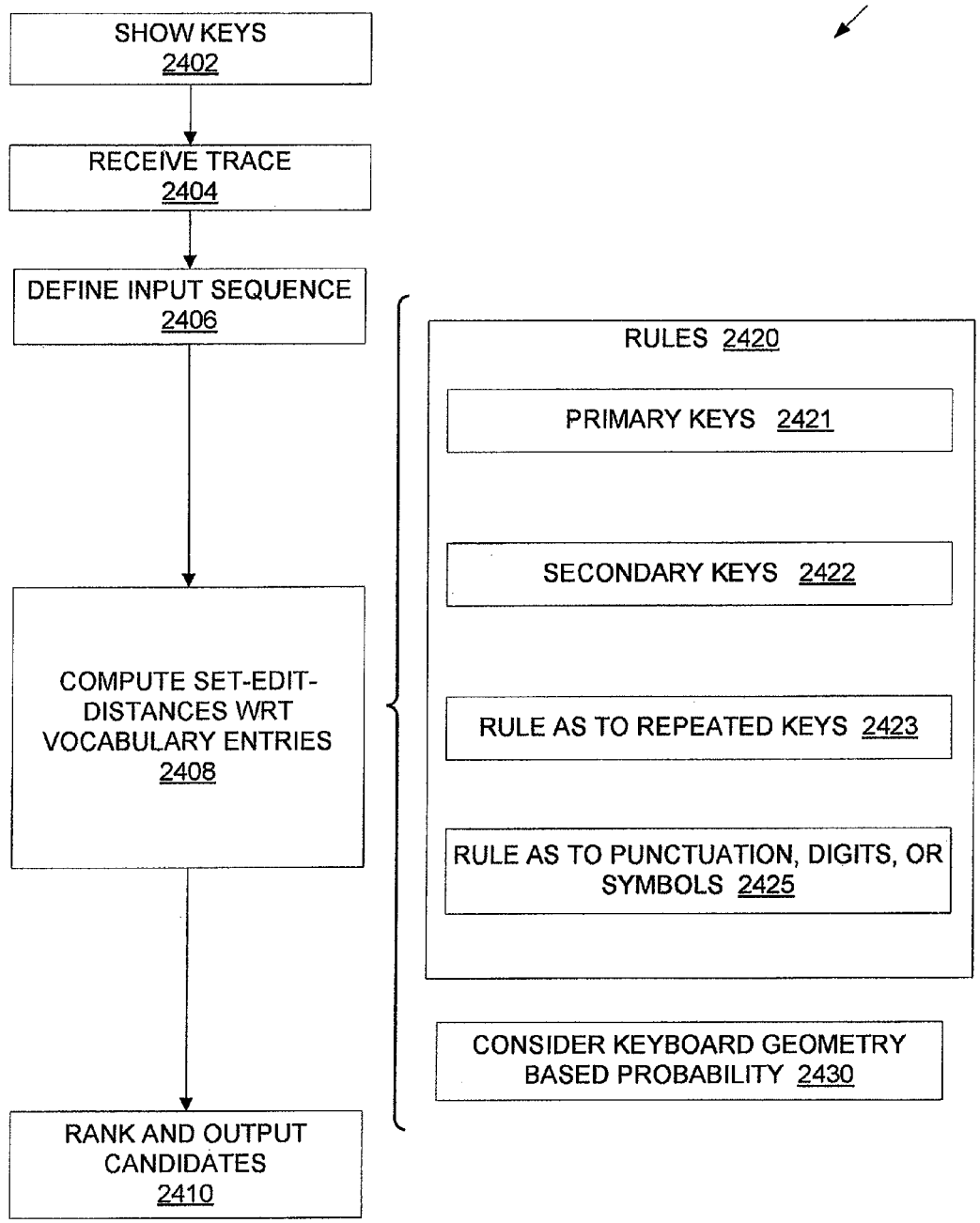
FIG. 24 is a flowchart showing an exemplary operating sequence for resolving user input entered via trace technology according to one embodiment of the invention.

FIG. 24 displays an operating sequence for resolving a user's trace input. Continuing with the example of FIG. 2, the display 203 employed in this example comprises a touch sensitive display, so the input device 202 includes a component that may be viewed as integrated with the display 203. Of course, there may be additional input devices in the apparatus 200, however the relevant input device for the purposes of this sequence 2400 is the integrated touch sensitive display. For purposes of this example, the vocabulary modules 213 include at least a vocabulary database with multiple entries. The vocabulary modules 213 may referred to as a dictionary or a vocabulary.

Further continuing with the example of FIG. 2, the operations 2400 are performed by the CPU 201 in this example. In step 2402, the CPU 201 displays the soft keyboard on the touch sensitive display 203. The soft keyboard contains one or more characters. For purposes of illustration, a QWERTY keyboard is discussed, as exemplified by the keyboard 1700.

In step 2404, the apparatus 200 receives the user's trace via the touch sensitive display surface. The trace comprises a single continuous trace contacting multiple of the displayed keys. The contacted keys include a start key where the trace begins, and end trace where the trace stops, and various keys between the start and end keys. For ease of illustration, this example uses the trace of "pretty" as shown in FIG. 17. In one example, the CPU 201 stores the coordinates or other machine-readable representation of the traced path.

Based on the trace received in step 2404, step 2406 establishes an input sequence. The input sequence includes the contacted keys as described above. The input sequence further includes a variety of other "auxiliary" keys not actually contacted by the trace, but proximate to the trace.

Figure 25:
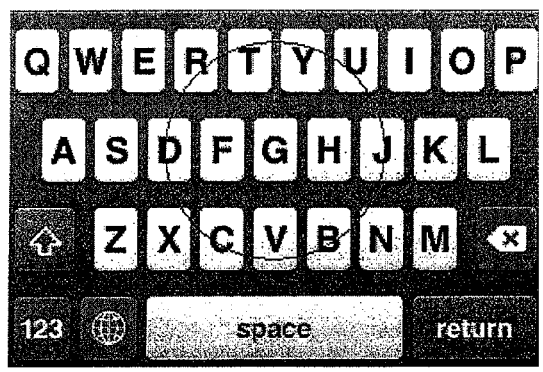
FIGS. 25-26 are screenshots of a keyboard showing various approaches to determining auxiliary keys according to one embodiment of the invention.
Figure 26:
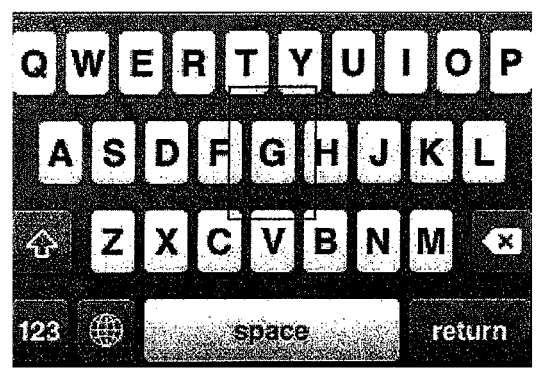

Step 2406 may use one or more different criteria to identify auxiliary keys. For instance, as shown in FIG. 25, when a trace contacts a key, all keys within a prescribed radius of the contacted key may be considered auxiliary keys, which are part of the input sequence. Under a different approach, shown in FIG. 26, when a trace contacts a given key, all keys within a prescribed rectangular "touch-area" centered upon the given key are considered to be auxiliary keys, and therefore part of the input sequence. Depending upon the dimensions of the touch-area, this criteria may be useful in more narrowly defining the auxiliary keys. One example of a working touch-area is an area twice the size of a representative soft key. In the example of FIG. 26, the auxiliary keys of the contacted "G" key include neighbors T, Y, F, H, C, and B.

A further example of a criteria to identify auxiliary keys is an ellipse along the trajectory of the trace. This gives extra consideration to horizontal undershooting and overshooting errors, and minimizes vertical errors in the trace. This approach has a preference, therefore, for keys along the direction of trace movement.

Optionally, step 2406 may expand the input sequence to include variants of the keys in the input sequence. For example, variants with accents, umlauts, typographical changes, and variations corresponding to foreign languages and alphabets may be considered. FIG. 23 represents a listing of the input sequence corresponding to the trace 1706 and the probabilities of the respective keys of the input sequence.

Step 2406 defines a set of "primary" or keys to include (1) the start key and its auxiliaries, (2) the end key and its auxiliaries, and (3) any key where a predetermined minimum direction change occurs and the auxiliaries of that key. The contacted keys (and their auxiliaries) between these primary keys are called "intervening" keys. The keys in the input sequence that are not "primary" are referred to as "secondary" or "optional" keys. Thus, the secondary keys include the intervening keys and their auxiliaries.

In the example of FIG. 17, the trace contacted P, O, I, U, Y, T, R, E, R, T, and Y. Here, step 2406 defines the following keys: (1) primary keys including a start key as P with auxiliary key O, (2) secondary keys including intervening keys O, I, U, Y, T, R with no auxiliaries due to the speed or direction of trace, (3) primary keys including direction-changing-key E with auxiliaries W and R, (4) secondary keys including intervening keys R and T with no auxiliaries due to the speed or direction of trace, and (5) primary keys including an end key Y and its auxiliaries T and U.

After step 2406, an input sequence has been defined. In step 2408, the CPU 201 compares the input sequence from step 2406 to some or all entries from the vocabulary 213, one at a time. The vocabulary entry under consideration at any time is referred to as the "current" entry.

Comparing to all entries in the vocabulary 213 may be too consuming or consumptive of processing resources, so various techniques may be used to limit comparison to certain vocabulary entries only. For instance, step 2408 may limit comparison to the entries in the vocabulary 213 having the highest frequency-of-use. Optionally, the decision in step 2408 to limit such comparison may be made in real time, for example when there is a given workload on the CPU 201, or when the processing of step 2408 reaches a prescribed level, continues for a prescribed duration, or performs a given number of matrix operations.

In the illustrated example, step 2408 carries out the comparison between input sequence and the current vocabulary entry by computing a set-edit-distance as described above. The result is a metric that indicates the degree of similarity between the input sequence and the current vocabulary entry. Set-edit-distance is computed in similar manner as FIG. 4, where each matrix row considers multiple characters that might have been intended by the user's action. However, in the current example applicable to trace input, the different matrix rows show different keys grouped together as follows: one row for the starting key and its auxiliaries, one row for each key (and auxiliaries) where the trace exhibited a significant change of direction, one row for each group of intervening keys and their auxiliaries, and one row for the ending key and its auxiliaries.

In the sequence 2400, computation of set-edit-distance is further distinguished from non-trace embodiments of set-edit-distance computation by the application of a number of rules 2420. Rule 2421 defines a number of groups of primary keys. Each group is shown on a different row in the matrix 1800. At least one key from each group must be considered in the set-edit-distance computation or there is a penalty. In other words, there a penalty is assessed for each group that is not represented in the current vocabulary entry. These groups include (1) the start key and all of its auxiliaries as shown by 1802 in the matrix 1800, (2) the end key and all of its auxiliaries as shown by 1808, (3) any key where a predetermined minimum change in direction occurs and the auxiliaries to this key, as exemplified by 1805. Thus, there is a penalty if the current vocabulary entry omits the start key and all of its auxiliaries, another penalty if the current vocabulary entry omits the end key and all of its auxiliaries, etc.

Rule 2422 concerns secondary keys. For these keys, rule 2422 prescribes that there is no penalty if the current vocabulary entry omits any or all of these keys. In the set-edit-distance computation, this rule permits a free cost delete for each of the secondary keys. The secondary keys are shown by rows 1804 and 1806 in the matrix 1800.

Rule 2423 sets forth a rule as to repeated keys 2423. For example, rule 2423 may prescribe that there is no penalty if the current vocabulary entry uses any key in the input sequence twice or more times in a row. This allows for double-letters (or triple-letters, or greater), since it could be difficult for users to signify a repeated letter using trace. Thus, in the set-edit-distance computation, this rule permits a free cost add. Beyond trace technology, this rule may be implemented to resolve a variety of non-traced user input, such as keyboard, twelve-key keypad, and the like. For instance, in the case of a twelve-key keypad, pressing the number "3" key one time could yield the word "FED" since the "3" key represents the characters "3EFD."

Rule 2425 concerns punctuation, digits, and symbols. This rule says that the set-edit-distance computation 2408 does not impose any penalty if the current vocabulary entry includes characters of a prescribed group (such as punctuation, digits, symbols, out-of-alphabet characters such as Greet/Cyrillic, etc.). These are examples of characters that are more difficult to enter. As a modification to this embodiment, the rule 2425 may prescribe that there is no penalty for using characters of a prescribed group as long as that group is not individually depicted at the time the trace was made. For instance, if the soft keyboard did not include display of a pallet of punctuation characters at the time the trace was made, then there is no penalty if the current vocabulary entry includes one or more of these punctuation characters that are absent from the input sequence. Thus, in the set-edit-distance computation, this rule permits a free cost add.

The rules 2425, as well as the rule 2423, have broader application than trace technology. For instance, these rules may be used to broaden the interpretation of inherently ambiguous user input submitted via a keypad where the keys concurrently represent multiple characters. Thus, in the case of rule 2425, the apparatus would automatically provide telephone keypad user with words that include digits or punctuations or special symbols that the user never entered. In the case of the rule 2423, the apparatus would automatically consider words with repeated keys (such as "OO" instead of "O"), or even different characters of the same key being repeated (such as "FED" instead of "F"). One exemplary publication concerning resolving ambiguous twelve-key input is U.S. Pat. No. 5,818,437 entitled REDUCED KEYBOARD DISAMBIGUATING COMPUTER, issued on Oct. 6, 1998 in the names of Grover et al. The entirety of the foregoing patent is hereby incorporated herein by reference.

Figures 19, 20, 21, 22:
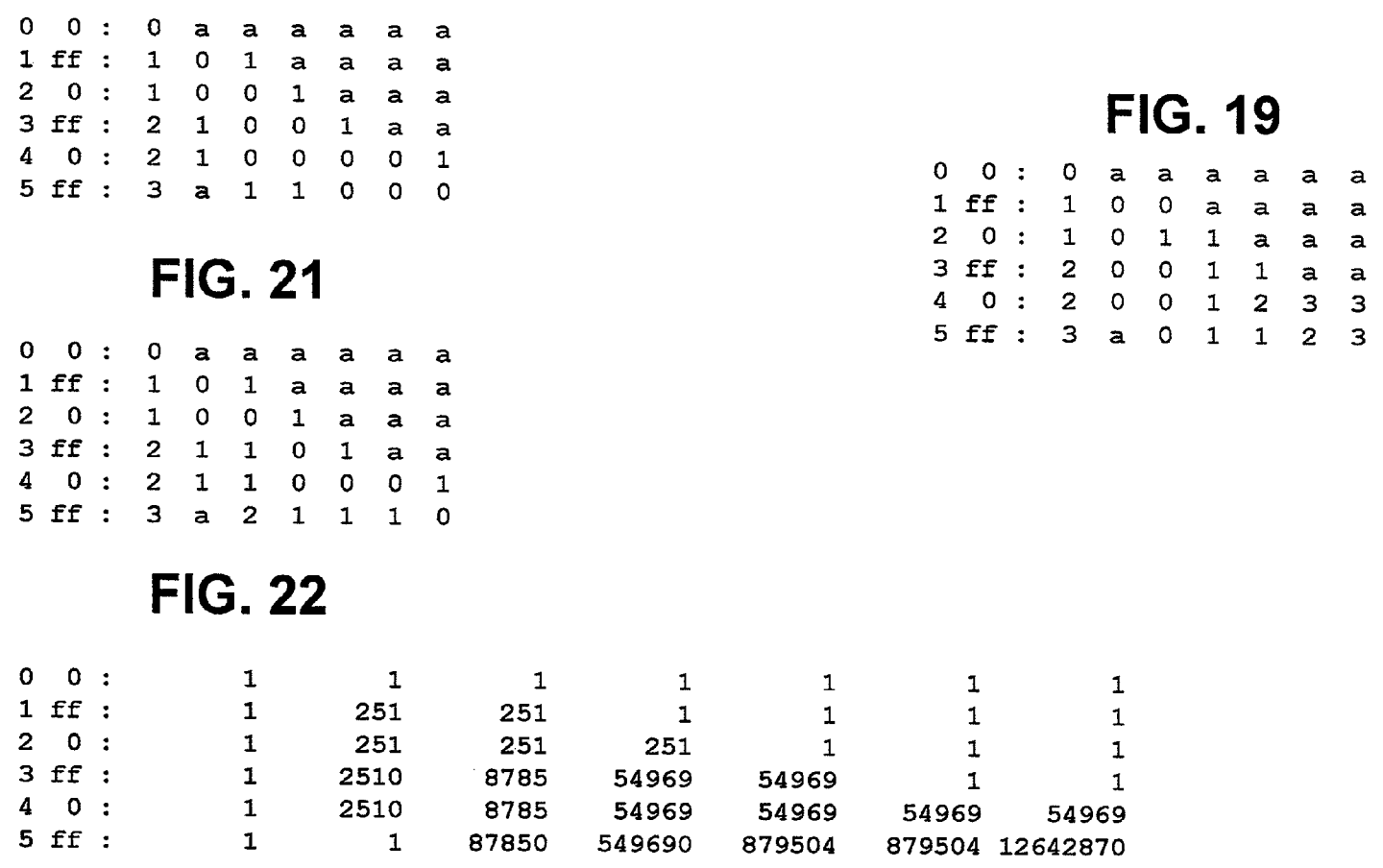

The matrix of FIG. 20 illustrates the computation of set-edit-distance for the candidate word "pretty." In this example, the computed set-edit-distance is zero.

One possible change to step 2408's computation of set-edit-distance is the consideration of probability based on keyboard geometry. Namely, the computed set-edit-distance metric for a given candidate word may be further modified according to the probability that the user intended the characters of the candidate word. For instance, if the approach of FIG. 25 was used to identify auxiliary keys, then each auxiliary key may be associated with a probability computed according to Equation 1:

$$\text{Probability} = 1 - \text{Distance}/\text{Radius} \qquad [\text{Eq. 1}]$$

where:
  distance equals the distance between the key central to the circle and the auxiliary key;
  radius is the radius of the circle.

In the different example of FIG. 26, each auxiliary key is associated with a probability computed according to Equation 2:

$$\text{Probability} = \text{Overlap}/\text{Touch-Area} \qquad [\text{Eq. 2}]$$

where:
  overlap is the area of the subject auxiliary key that intersects the touch-area.
  touch-area is the area within the touch-area.

As an enhanced or alternative approach, key strike probability for a given key may be based at least in part on the speed of the traced path past the given key. In other words, key strike probability may be inversely proportional to trace speed. Thus, if the user's finger of stylus moved past a given key more quickly, the key strike probability of that key is less.

Regardless of which approach is used to determine these probabilities, the probabilities of all keys in the candidate word are considered according to one of various approaches. In one simplified embodiment, the probabilities of all keys in the candidate word are multiplied together, and the set-edit-distance is divided by this number. Thus, candidate words with more auxiliary keys result in an inflated set-edit-distance.

In a different embodiment, the probabilities are input into a probability shadow matrix, as exemplified by FIG. 22. This is used as a secondary consideration, for example, to resolve a tie between two candidate words having the same set-edit-distance. In this example, the probability computed by the shadow matrix of FIG. 22 is 12,642,870. The probabilities input into the matrix of FIG. 22 arise from whatever key strike probabilities are implemented as discussed above, such as the examples of FIGS. 25-26. For example, this probability computation may be performed using tap frequency, as discussed in detail above.

In this regard, step 2408 may compute various further shadow matrices, for use in resolving ties between candidate words with the same set-edit-distance. These shadow matrices include, in one example, a matrix that computes the number of free adds required to reach a candidate word. FIG. 19 shows an example of this shadow matrix. The matrix of FIG. 19 indicates three free ads. The shadow matrices may also include a matrix that computes the stem-edit-distance for the candidate word. FIG. 21 is an example of this shadow matrix. In this example, the stem-edit-distance from FIG. 21 is zero.

In one embodiment, step 2408 may be streamlined by computing set-edit-distance, as exemplified by FIG. 20, and then omitting the computation of one or all shadow matrices if the set-edit-distance matrix exceeds a prescribed threshold size. This helps step 2408 to complete more quickly.

After step 2408, step 2410 takes the vocabulary entries for which set-edit-distance was computed, and ranks them according to their set-edit-distance metrics. Step 2410 provides a visual output of this highest ranking candidate entries, such as upon the display 203, according to a given criteria. For instance, the criteria may specify the top ten entries, top twenty entries, the number of entries that fit on the display screen, or other criteria.

Although the routine 2400 describes various "free cost" adds and deletes, one embodiment of the sequence still tracks the use of these free features. This data may be used for various purposes, such as providing an improved confidence measure, namely breaking ties between words that did not use any free adds or deletes versus those that did.

Specific Example

To further illustrate the sequence 2400, this following specific example is given. In step 2402 the system 200 displays the soft keyboard 1700 depicted in FIG. 17. In step 2404 the system 200 receives the user's trace, which is shown by reference 1706 in FIG. 17. In step 2406, the system defines the user's input sequence. Here, the trace directly contacts keys P, O, I, U, Y, T, R, E, R, T, and Y. The total input sequence, including these keys and their auxiliaries include the following:

(1) PO: primary keys including a contacted starting key P, plus auxiliary O because it satisfies the rectangular probability approach and satisfies a preference for keys along the direction of trace movement.
(2) OIUYTR: secondary, intervening keys O, I, U, Y, T, and R, with no auxiliaries due to the speed or direction of trace.
(3) EWR: primary keys including contacted direction changing key E, plus W and R because they are auxiliaries to E.
(4) RT: secondary, intervening keys R and T with no auxiliaries due to the speed or direction of trace.
(5) YTU: primary keys including contacted end key Y, along with T and U because they are auxiliary to Y.

Next, step 2406 computes set-edit-distance for the input sequence of step 2406. In one example, step 2406 is carried out (at least in part) using the matrix 1800 of FIG. 18. This matrix employs similar concepts as the matrix of FIG. 4, but with several new twists due to the use of trace. These were explained above, and will be further explained below.

The words 1810 are a representative few of the vocabulary entries compared to the current input sequence in step 2406. As mentioned, comparison may be made to some or all of the vocabulary entries. The row 1802 corresponds to PO, the row 1804 to OIUYTR, the row 1805 to EWR, the row 1806 to RT, and the row 1808 to YTU. The asterisks in rows 1804, 1806 indicate that the keys of these rows are secondary keys.

In this example, the rules 2420 are applied as follows. Rule 2421 says that it is mandatory that the start key P or its auxiliary O is considered in row 1802, and the end key Y or its auxiliaries T or U are considered in row 1808, and the direction-changing key E or its auxiliaries W or R are considered in the row 1805. The row 1804 of secondary keys OIUYTR and the row 1806 of secondary keys RT are secondary keys, do under rule 2422, they may be ignored without cost to the set-edit-distance. Rule 2423 prescribes that any of the keys 1802, 1804, 1805, 1806, and 1808 may be repeated any number of times without penalty. Rule 2425 is not applicable to this particular example because none of the candidate entries 1810 in this example include punctuation or special symbols.

Figure 18:
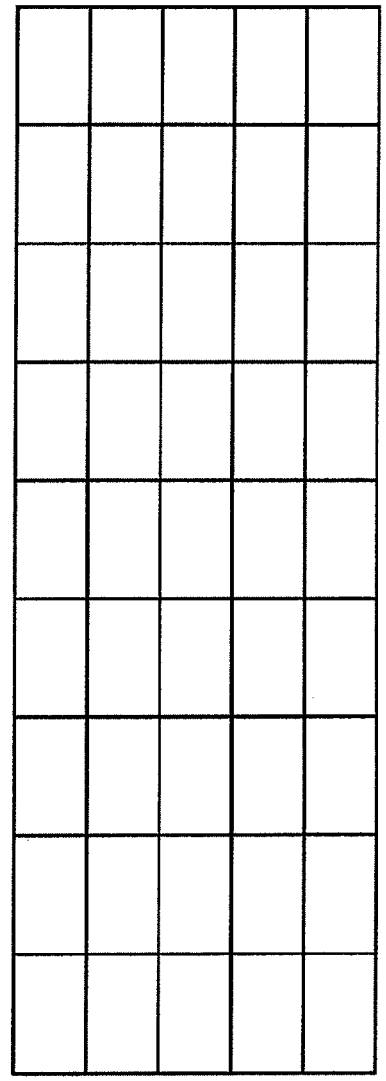
FIG. 18 shows a layout for a set-edit-distance matrix to be computed for a traced input according to one embodiment of the invention.
Figures 27, 28, 29, 30:
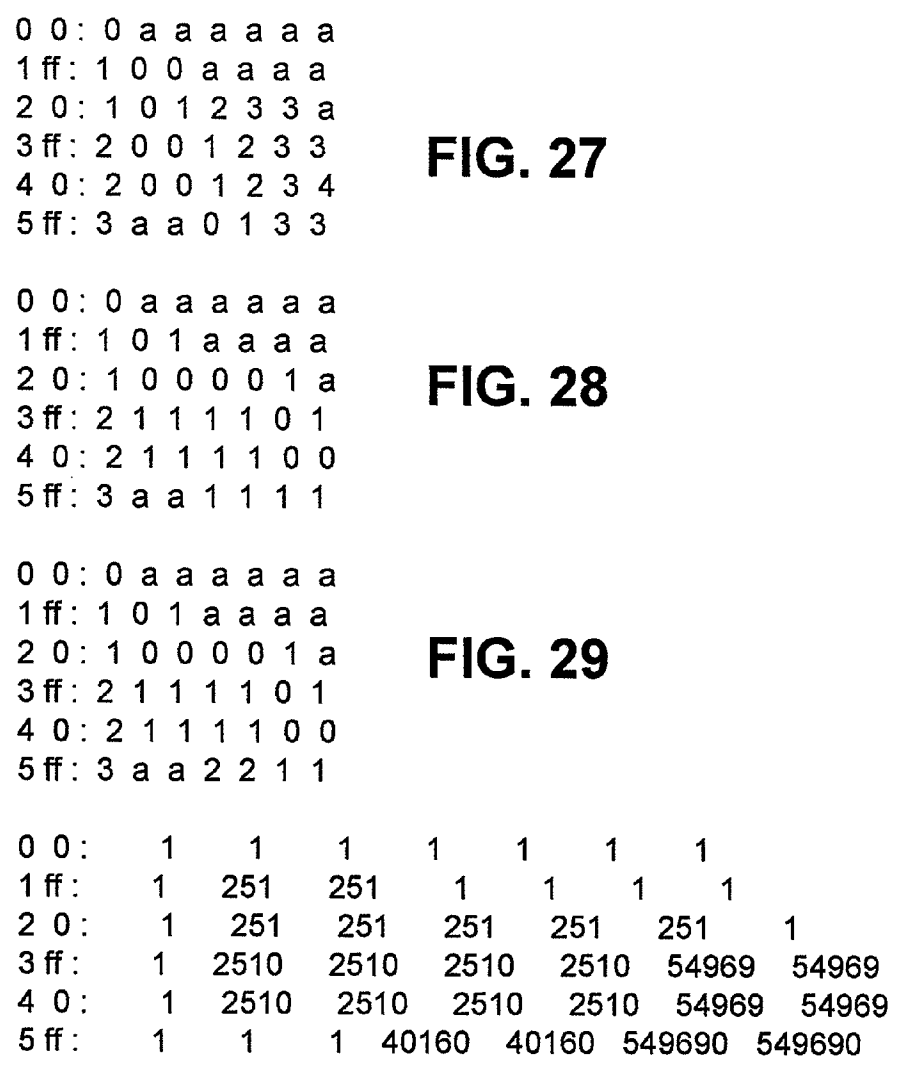

FIG. 28 shows a matrix computing set-edit-distance for the vocabulary entry "potter" of FIG. 18. In this example, the candidate word "pretty" wins over "potter," since the set-edit-distance for "pretty" is zero.

If there were a tie, then step 2408 would consider one or more shadow matrices for the word "potter" to resolve the tie. In this regard, the matrix of FIG. 27 shows a shadow matrix that computes the number of free adds required to reach the candidate entry "potter," which in this example is three. FIG. 29 shows a shadow matrix for stem-edit-distance, and FIG. 30 shows a shadow matrix for key strike probability.

OTHER EMBODIMENTS

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the present invention, and the scope of the present invention fully encompasses other embodiments which may become obvious to those skilled in the art, and that the scope of the present invention is accordingly to be limited by nothing other than the appended claims.

What is claimed is:

1. A text input apparatus, comprising:
a display including a touch sensitive display surface;
digital data storage containing a vocabulary database including multiple vocabulary entries; and
coupled to the display and the storage, a processor programmed to perform operations comprising:
directing the display to show an arrangement of keys, each key representing one or more characters;
via the display surface, receiving user input comprising a single continuous trace contacting multiple of the keys in an order, including a start key, an end key, and any intervening keys between the start key and the end key;
defining an input sequence including the contacted keys and also including any auxiliary keys comprising keys exhibiting prescribed proximity to the contacted keys;
comparing the input sequence to candidate entries from the vocabulary, including the following operations for each candidate entry:
computing a set-edit-distance metric to calculate a matching metric between said input sequence and the candidate entry;
where:
the set-edit-distance computation imposes a penalty for, omitting from the candidate word all keys from a first group comprising the start key and auxiliary keys to the start key;
the set-edit-distance computation imposes a penalty for omitting from the candidate word all keys from a second group comprising the end key and auxiliary keys to the end key;
the set-edit-distance computation imposes a penalty for omitting from the candidate word all keys from a third group comprising any contacted keys and their auxiliaries where at least a prescribed minimum change in direction of the trace occurs;
the set-edit-distance computation does not impose any penalty for omitting from the candidate word any key of the input sequence outside all of the first, second, and third groups; and
the set-edit-distance computation does not impose any penalty for using any key in the input sequence twice or more in succession in the candidate word; and
ranking the candidate words according to criteria including at least the computed set-edit-distance metric, and providing an output of at least some of the ranked candidate words.

2. The apparatus of claim 1, where:
the set-edit-distance computation does not impose any penalty for a candidate word including characters of a prescribed group comprising any of: punctuation, digits, and symbols.

3. The apparatus of claim 1, where:
the operations further include computing a keyboard-geometry-based probability in association with each computed set-edit-distance metric;
using the computed probability to break ties between similarly ranked candidate words.

4. The apparatus of claim 3, where:
for each of the intervening keys, the keyboard-geometry-based probability is reduced according to speed at which the traced passed over the intervening key.

5. The apparatus of claim 3, where:
the keyboard-geometry-based probability of a given key varies with radius of the key from a point on the trace.

6. The apparatus of claim 3, where:
the keyboard-geometry-based probability of a given key varies according to area of the given key intersecting a prescribed rectangular touch area centered upon a contacted key nearest to the given key.

7. The apparatus of claim 1, where:
the ranking operation is conducted so as to rank candidate words according criteria including the set-edit-distance metric and a language-model-based probability.

8. The apparatus of claim 1, where the operations further include:
tracking free cost adds and deletes and using the tracked free cost adds and deletes to break ties between similarly ranked candidate words.

9. The apparatus of claim 1, where the operations further include:
computing stem-edit-distance and using the computed stem-edit-distance to break ties between similarly ranked candidate words.

10. A method, comprising operations of:
directing a display to show an arrangement of keys, each key representing one or more characters, where the display includes a touch sensitive surface;
via the display surface, receiving user input comprising a single continuous trace contacting multiple of the keys in an order, including a start key, an end key, and any intervening keys between the start key and the end key;
defining an input sequence including the contacted keys and also including any auxiliary keys comprising keys exhibiting prescribed proximity to the contacted keys;
comparing the input sequence to candidate entries from a vocabulary containing multiple vocabulary entries, the comparing operation including the following operations for each candidate entry: computing a set-edit-distance metric to calculate a matching metric between said input sequence and the candidate entry;
where:
the set-edit-distance computation imposes a penalty for omitting from the candidate word all keys from a first group comprising the start key and auxiliary keys to the start key;
the set-edit-distance computation imposes a penalty for omitting from the candidate word all keys from a second group comprising the end key and auxiliary keys to the end key;
the set-edit-distance computation imposes a penalty for omitting from the candidate word all keys from a third group comprising any contacted keys and their auxiliaries where at least a prescribed minimum change in direction of the trace occurs;
the set-edit-distance computation does not impose any penalty for omitting from the candidate word any key of the input sequence outside all of the first, second, and third groups; and
the set-edit-distance computation does not impose any penalty for using any key in the input sequence twice or more in succession in the candidate word; and
ranking the candidate words according to criteria including at least the computed set-edit-distance metric, and providing an output of at least some of the ranked candidate words;
where at least one of the operations is performed by a processor.

11. The method of claim 10, where:
the set-edit-distance computation does not impose any penalty for a candidate word including characters of a prescribed group comprising any of: punctuation, digits, and symbols.

12. The method of claim 10, where:
the operations further include computing a keyboard-geometry-based probability in association with each computed set-edit-distance metric;
using the computed probability to break ties between similarly ranked candidate words.

13. The method of claim 12, where:
for each of the intervening keys, the keyboard-geometry-based probability is reduced according to speed at which the trace passed over the intervening key.

14. The method of claim 12, where:
the keyboard-geometry-based probability of a given key varies with radius of the key from a point on the trace.

15. The method of claim 12, where:
the keyboard-geometry-based probability of a given key varies according to area of the given key intersecting a prescribed rectangular touch area centered upon a contacted key nearest to the given key.

16. The method of claim 10, where:
the ranking operation is conducted so as to rank candidate words according to criteria including set-edit-distance metric and a language-model-based probability.

17. The method of claim 10, where the operations further include:
tracking free cost adds and deletes and using the tracked free cost adds and deletes to break ties between similarly ranked candidate words.

18. The method of claim 10, where the operations further include:
computing stem-edit-distance and using the computed stem-edit-distance to break ties between similarly ranked candidate words.

19. An article of manufacture comprising at least one medium of digital data storage containing non-transitory storage of a program executable by a processor to perform the operations of claim 10.

\* \* \* \* \*